US012793094B2

(12) United States Patent
Todd et al.

(10) Patent No.: US 12,793,094 B2
(45) Date of Patent: Nov. 10, 2026

(54) CROWD-SOURCED RESEARCH RELEVANCE TRACKING AND ANALYTICS

(71) Applicant: Dell Products L.P., Round Rock, TX (US)

(72) Inventors: Stephen James Todd, North Andover, MA (US); David Edward Frattura, Stamford, CT (US); Eloy Francisco Macha, Crowley, TX (US); Robert Anthony Lincourt, Jr., Franklin, MA (US)

(73) Assignee: Dell Products L.P., Round Rock, TX (US)

( * ) Notice: Subject to any disclaimer, the term of this patent is extended or adjusted under 35 U.S.C. 154(b) by 689 days.

(21) Appl. No.: 18/162,219

(22) Filed: Jan. 31, 2023

(65) Prior Publication Data

US 2024/0257167 A1 Aug. 1, 2024

(51) Int. Cl.
*G06Q 30/02* (2023.01)
*G06Q 30/0202* (2023.01)

(52) U.S. Cl.
CPC ................................ *G06Q 30/0202* (2013.01)

(58) Field of Classification Search
None
See application file for complete search history.

(56) References Cited

U.S. PATENT DOCUMENTS

| | | | |
|---|---|---|---|
| 7,512,612 | B1 | 3/2009 | Akella et al. |
| 7,805,440 | B2 | 9/2010 | Farrell et al. |
| 10,958,694 | B2 | 3/2021 | Sandholm et al. |
| 11,232,383 | B1 | 1/2022 | Burns, Sr. et al. |
| 11,947,598 | B2 | 4/2024 | Zhou et al. |
| 2005/0038533 | A1 | 2/2005 | Farrell et al. |
| 2007/0150480 | A1 | 6/2007 | Hwang et al. |
| 2009/0138430 | A1 | 5/2009 | Nambiar et al. |

(Continued)

FOREIGN PATENT DOCUMENTS

| | | |
|---|---|---|
| WO | 2019089482 A1 | 5/2019 |

OTHER PUBLICATIONS

J. Leung, Examining the Characteristics of Practical Knowledge From Four Public Facebook Communities of Practice in Instructional Design and Technology, 90669-90689, 2022 (21 pages).

(Continued)

*Primary Examiner* — Alan Torrico-Lopez
(74) *Attorney, Agent, or Firm* — Chamberlain, Hrdlicka, White, Williams & Aughtry; Aly Z. Dossa

(57) ABSTRACT

A method and system for crowd-sourced research relevance tracking and analytics. Through crowd-sourcing, any number of tasks, information, and/or inputs may be obtained by way of enlisting the services or activities of multiple individuals (i.e., a crowd). Further, the viewpoints of a crowd can often be a strong measure or indicator of current and/or future relevance within various realms such as events, social interactions, research, technologies, markets, and so forth. Embodiments disclosed herein, accordingly, implement a form of crowd-sourcing whereby the online content consumption of subject matter experts may be tracked, captured, and subsequently analyzed to predict or identify emergent trends relevant to their respective knowledge domain(s).

14 Claims, 20 Drawing Sheets

(56) References Cited

U.S. PATENT DOCUMENTS

| | | | |
|---|---|---|---|
| 2012/0096002 | A1 | 4/2012 | Sheehan et al. |
| 2014/0223467 | A1* | 8/2014 | Hayton .............. H04N 21/4668 725/18 |
| 2015/0104765 | A1 | 4/2015 | Towle et al. |
| 2015/0206055 | A1 | 7/2015 | Sengupta et al. |
| 2015/0356431 | A1 | 12/2015 | Saxena et al. |
| 2016/0092404 | A1 | 3/2016 | Farouki et al. |
| 2016/0269328 | A1 | 9/2016 | Pola |
| 2017/0220535 | A1 | 8/2017 | Olsen et al. |
| 2017/0316098 | A1 | 11/2017 | Meyerzon et al. |
| 2017/0371881 | A1 | 12/2017 | Reynolds et al. |
| 2018/0218042 | A1 | 8/2018 | Krishnan et al. |
| 2018/0324976 | A1 | 11/2018 | Gao et al. |
| 2019/0050874 | A1* | 2/2019 | Matlick ................. H04L 67/535 |
| 2019/0340945 | A1 | 11/2019 | Malhotra |
| 2020/0019822 | A1 | 1/2020 | Kothandaraman et al. |
| 2020/0210383 | A1 | 7/2020 | Demaris et al. |
| 2020/0382586 | A1 | 12/2020 | Badawy et al. |
| 2021/0304044 | A1 | 9/2021 | Nagarajan et al. |
| 2021/0342125 | A1 | 11/2021 | Burnett |
| 2022/0188698 | A1* | 6/2022 | Halecky ............. G06Q 30/0613 |
| 2022/0361376 | A1 | 11/2022 | Gao |
| 2023/0353651 | A1 | 11/2023 | Maurer et al. |
| 2023/0376496 | A1 | 11/2023 | Jacob et al. |
| 2024/0138106 | A1 | 4/2024 | Duncan et al. |

OTHER PUBLICATIONS

Totet, Matthieu, K-partite and Bipartite Graph (Multimode Networks Transformations), pp. 1-8, 2021 (8 pages).

* cited by examiner

CROWD-SOURCED RESEARCH RELEVANCE TRACKING AND ANALYTICS

BACKGROUND

Organization strategy may reference a plan (or a sum of actions), intended to be pursued by an organization, directed to leveraging organization resources towards achieving one or more long-term goals. Said long-term goal(s) may, for example, relate to identifying or predicting future or emergent trends across one or more industries. Digitally-assisted organization strategy, meanwhile, references the scheming and/or implementation of organization strategy, at least in part, through insights distilled by artificial intelligence.

SUMMARY

In general, in one aspect, embodiments disclosed herein relate to a method for crowd-sourced information analyses. The method includes: detecting an initiation of an online content consumption session; obtaining a tracking mode for the online content consumption session; collecting online consumption information based on the tracking mode; following a termination of the online content consumption session: producing weighted online consumption information from at least the online consumption information; and obtaining crowd-sourced results through analysis of a collection of weighted online consumption information including the weighted online consumption information.

In general, in one aspect, embodiments disclosed herein relate to a non-transitory computer readable medium (CRM). The non-transitory CRM includes computer readable program code, which when executed by a computer processor, enables the computer processor to perform a method for crowd-sourced information analyses. The method includes: detecting an initiation of an online content consumption session; obtaining a tracking mode for the online content consumption session; collecting online consumption information based on the tracking mode; following a termination of the online content consumption session: producing weighted online consumption information from at least the online consumption information; and obtaining crowd-sourced results through analysis of a collection of weighted online consumption information including the weighted online consumption information.

In general, in one aspect, embodiments disclosed herein relate to a system. The system includes: an insight service including a computer processor configured to perform a method for crowd-sourced information analyses. The method includes: detecting an initiation of an online content consumption session; obtaining a tracking mode for the online content consumption session; collecting online consumption information based on the tracking mode; following a termination of the online content consumption session: producing weighted online consumption information from at least the online consumption information; and obtaining crowd-sourced results through analysis of a collection of weighted online consumption information including the weighted online consumption information.

Other aspects disclosed herein will be apparent from the following description and the appended claims.

BRIEF DESCRIPTION OF DRAWINGS

FIGS. 5B-5L shows example scenarios in accordance with one or more embodiments disclosed herein.

DETAILED DESCRIPTION

Specific embodiments disclosed herein will now be described in detail with reference to the accompanying figures. In the following detailed description of the embodiments disclosed herein, numerous specific details are set forth in order to provide a more thorough understanding disclosed herein. However, it will be apparent to one of ordinary skill in the art that the embodiments disclosed herein may be practiced without these specific details. In other instances, well-known features have not been described in detail to avoid unnecessarily complicating the description.

In the following description of FIGS. 1A-5L, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments disclosed herein relate to crowd-sourced research relevance tracking and analytics. Through crowd-sourcing, any number of tasks, information, and/or inputs may be obtained by way of enlisting the services or activities of multiple individuals (i.e., a crowd). Further, the viewpoints of a crowd can often be a strong measure or indicator of current and/or future relevance within various realms such as events, social interactions, research, technologies, markets, and so forth. Embodiments disclosed herein, accordingly, implement a form of crowd-sourcing whereby the online content consumption of subject matter experts may be tracked, captured, and subsequently analyzed to predict or identify emergent trends relevant to their respective knowledge domain(s).

Figure 1A:
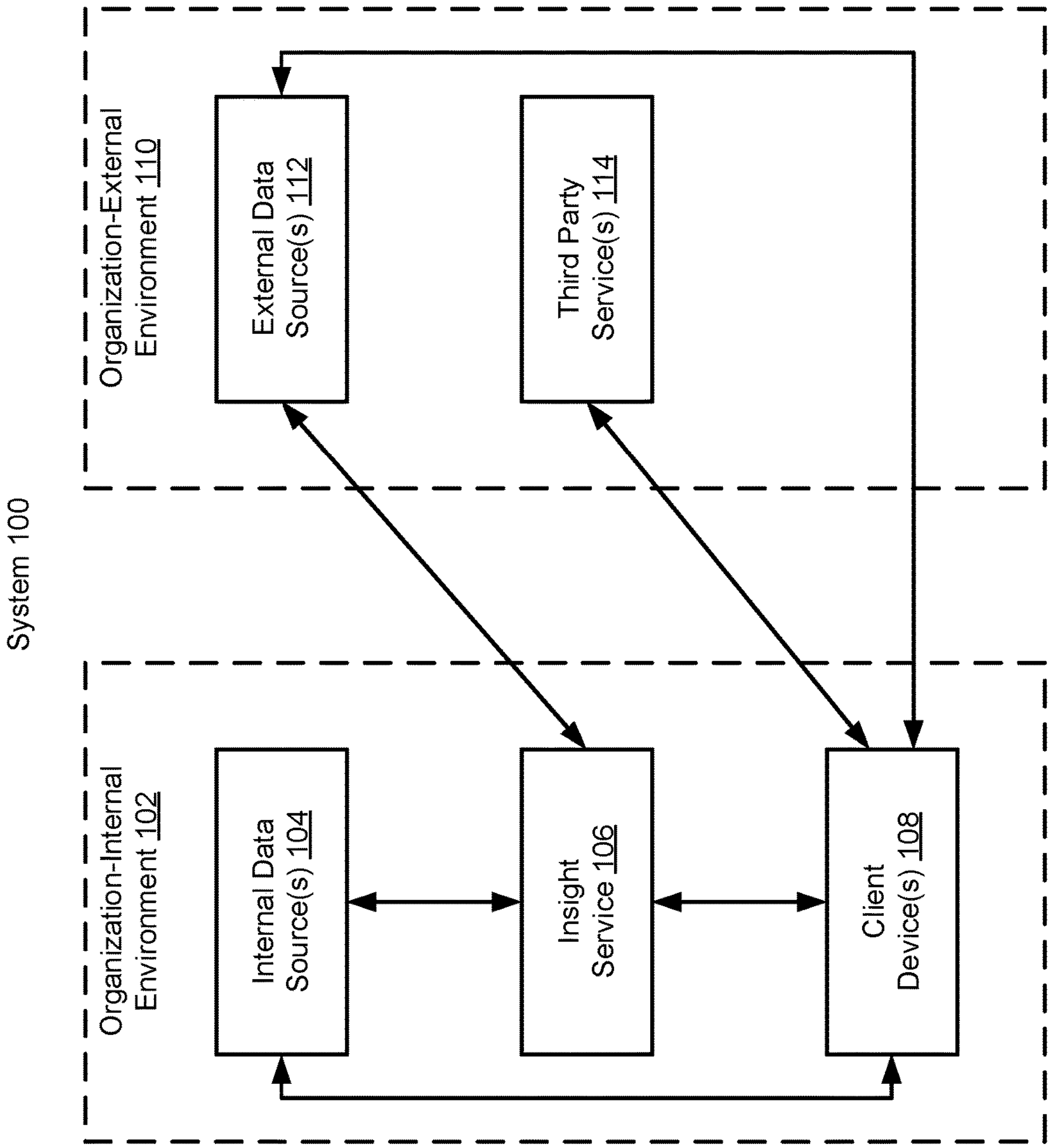
FIG. 1A shows a system in accordance with one or more embodiments disclosed herein.

FIG. 1A shows a system in accordance with one or more embodiments disclosed herein. The system (100) may include an organization-internal environment (102) and an organization-external environment (110). Each of these system (100) components is described below.

In one or many embodiment(s) disclosed herein, the organization-internal environment (102) may represent any digital (e.g., information technology (IT)) ecosystem belonging to, and thus managed by, an organization. Examples of said organization may include, but are not limited to, a business/commercial entity, a higher education school, a government agency, and a research institute. The organization-internal environment (102), accordingly, may at least reference one or more data centers of which the organization is the proprietor. Further, the organization-internal environment (102) may include one or more internal data sources (104), an insight service (106), and one or more client devices (108). Each of these organization-internal environment (102) subcomponents may or may not be co-located, and thus reside and/or operate, in the same physical or geographical space. Moreover, each of these organization-internal environment (102) subcomponents is described below.

In one or many embodiment(s) disclosed herein, an internal data source (104) may represent any data source belonging to, and thus managed by, the above-mentioned organization. A data source, in turn, may generally refer to a location where data or information (also referred to herein as one or more assets) resides. An asset, accordingly, may be exemplified through structured data/information (e.g., tabular data/information or a dataset) or through unstructured data/information (e.g., text, an image, audio, a video, an animation, multimedia, etc.). Furthermore, any internal data source (104), more specially, may refer to a location that stores at least a portion of the asset(s) generated, modified, or otherwise interacted with, solely by entities (e.g., the insight service (106) and/or the client device(s) (108)) within the organization-internal environment (102). Entities outside the organization-internal environment may not be permitted to access any internal data source (104) and, therefore, may not be permitted to access any asset(s) maintained therein.

Moreover, in one or many embodiment(s) disclosed herein, any internal data source (104) may be implemented as physical storage (and/or as logical/virtual storage spanning at least a portion of the physical storage). The physical storage may, at least in part, include persistent storage, where examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) disclosed herein, the insight service (106) may represent information technology infrastructure configured for digitally-assisted organization strategy. In brief, organization strategy may reference a plan (or a sum of actions), intended to be pursued by an organization, directed to leveraging organization resources towards achieving one or more long-term goals. Said long-term goal(s) may, for example, relate to identifying or predicting future or emergent trends across one or more industries. Digitally-assisted organization strategy, meanwhile, references the scheming and/or implementation of organization strategy, at least in part, through insights distilled by artificial intelligence. An insight, in turn, may be defined as a finding (or more broadly, as useful knowledge) gained through data analytics or, more precisely, through the discovery of patterns and/or relationships amongst an assortment of data/information (e.g., assets). The insight service (106), accordingly, may employ artificial intelligence to ingest assets maintained across various data sources (e.g., one or more internal data sources (104) and/or one or more external data sources (112)) and, subsequently, derive or infer insights therefrom that are supportive of an organization strategy for an organization.

In one or many embodiment(s) disclosed herein, the insight service (106) may be configured with various capabilities or functionalities directed to digitally-assisted organization strategy. Said capabilities/functionalities may include: crowd-sourced research relevance tracking and analytics, as described in FIG. 3 as well as exemplified in FIGS. 5A-5L, below. Further, the insight service (106) may perform other capabilities/functionalities without departing from the scope disclosed herein.

In one or many embodiment(s) disclosed herein, the insight service (106) may be implemented through on-premises infrastructure, cloud computing infrastructure, or any hybrid infrastructure thereof. The insight service (106), accordingly, may be implemented using one or more network servers (not shown), where each network server may represent a physical or a virtual network server. Additionally, or alternatively, the insight service (106) may be implemented using one or more computing systems each similar to the example computing system shown and described with respect to FIG. 4, below.

In one or many embodiment(s) disclosed herein, a client device (108) may represent any physical appliance or computing system operated by one or more organization users and configured to receive, generate, process, store, and/or transmit data/information (e.g., assets), as well as to provide an environment in which one or more computer programs (e.g., applications, insight agents, etc.) may execute thereon. An organization user, briefly, may refer to any individual whom is affiliated with, and fulfills one or more roles pertaining to, the organization that serves as the proprietor of the organization-internal environment (102). Further, in providing an execution environment for any computer programs, a client device (108) may include and allocate various resources (e.g., computer processors, memory, storage, virtualization, network bandwidth, etc.), as needed, to the computer programs and the tasks (or processes) instantiated thereby. Examples of a client device (108) may include, but are not limited to, a desktop computer, a laptop computer, a tablet computer, a smartphone, or any other computing system similar to the example computing system shown and described with respect to FIG. 4, below. Moreover, any client device (108) is described in further detail through FIG. 1B, below.

In one or many embodiment(s) disclosed herein, the organization-external environment (110) may represent any number of digital (e.g., IT) ecosystems not belonging to, and thus not managed by, an/the organization serving as the proprietor of the organization-internal environment (102). The organization-external environment (110), accordingly, may at least reference any public networks including any respective service(s) and data/information (e.g., assets). Further, the organization-external environment (110) may include one or more external data sources (112) and one or more third-party services (114). Each of these organization-external environment (110) subcomponents may or may not be co-located, and thus reside and/or operate, in the same physical or geographical space. Moreover, each of these organization-external environment (110) subcomponents is described below.

In one or many embodiment(s) disclosed herein, an external data source (112) may represent any data source (described above) not belonging to, and thus not managed by, an/the organization serving as the proprietor of the organization-internal environment (102). Any external data source (112), more specially, may refer to a location that stores at least a portion of the asset(s) found across any public networks. Further, depending on their respective access permissions, entities within the organization-internal environment (102), as well as those throughout the organization-external environment (110), may or may not be permitted to access any external data source (104) and, therefore, may or may not be permitted to access any asset(s) maintained therein.

Moreover, in one or many embodiment(s) disclosed herein, any external data source (112) may be implemented as physical storage (and/or as logical/virtual storage spanning at least a portion of the physical storage). The physical storage may, at least in part, include persistent storage, where examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) disclosed herein, a third party service (114) may represent information technology infrastructure configured for any number of purposes and/or applications. A third party, whom may implement and manage one or more third party services (114), may refer to an individual, a group of individuals, or another organization (i.e., not the organization serving as the proprietor of the organization-internal environment (102)) that serves as the proprietor of said third party service(s) (114). By way of an example, one such third party service (114), as disclosed herein may be exemplified by an automated machine learning (ML) service. A purpose of the automated ML service may be directed to automating the selection, composition, and parameterization of ML models. That is, more simply, the automated ML service may be configured to automatically identify one or more optimal ML algorithms from which one or more ML models may be constructed and fit to a submitted dataset in order to best achieve any given set of tasks. Further, any third party service (114) is not limited to the aforementioned specific example.

In one or many embodiment(s) disclosed herein, any third party service (114) may be implemented through on-premises infrastructure, cloud computing infrastructure, or any hybrid infrastructure thereof. Any third party service (114), accordingly, may be implemented using one or more network servers (not shown), where each network server may represent a physical or a virtual network server. Additionally, or alternatively, any third party service (114) may be implemented using one or more computing systems each similar to the example computing system shown and described with respect to FIG. 4, below.

In one or many embodiment(s) disclosed herein, the above-mentioned system (100) components, and their respective subcomponents, may communicate with one another through a network (not shown) (e.g., a local area network (LAN), a wide area network (WAN) such as the Internet, a mobile network, any other communication network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components and their respective subcomponents. Moreover, in communicating with one another, the above-mentioned system (100) components, and their respective subcomponents, may employ any combination of existing wired and/or wireless communication protocols.

While FIG. 1A shows a configuration of components and/or subcomponents, other system (100) configurations may be used without departing from the scope disclosed herein.

Figure 1B:
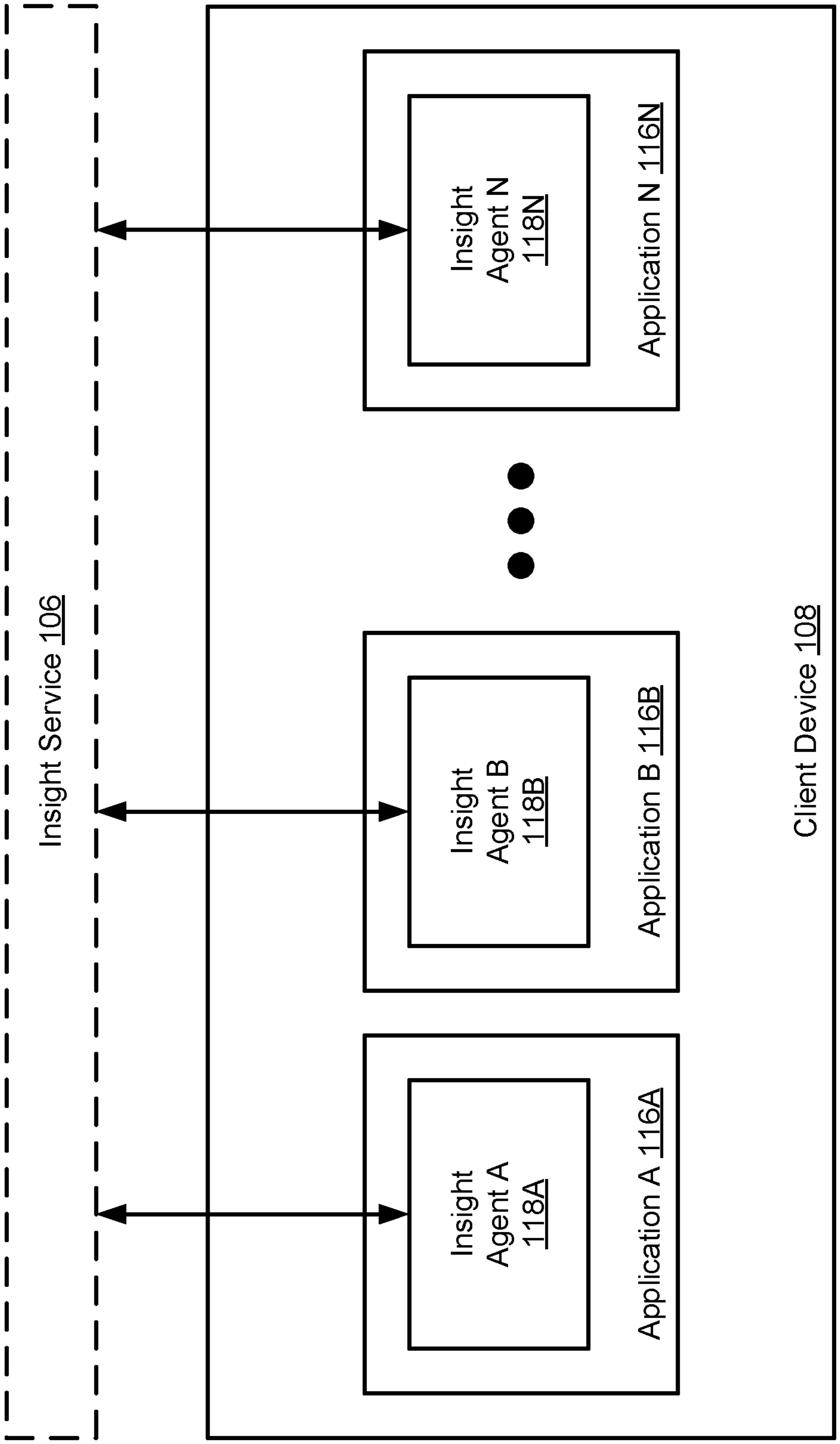
FIG. 1B shows a client device in accordance with one or more embodiments disclosed herein.

FIG. 1B shows a client device in accordance with one or more embodiments disclosed herein. The client device (108) (described above as well) (see e.g., FIG. 1A) may host or include one or more applications (116A-116N). Each application (116A-116N), in turn, may host or include an insight agent (118A-118N). Each of these client device (108) subcomponents is described below.

In one or many embodiment(s) disclosed herein, an application (116A-116N) (also referred to herein as a software application or program) may represent a computer program, or a collection of computer instructions, configured to perform one or more specific functions. Broadly, examples of said specific function(s) may include, but are not limited to, receiving, generating and/or modifying, processing and/or analyzing, storing or deleting, and transmitting data/information (e.g., assets) (or at least portions thereof). That is, said specific function(s) may generally entail one or more interactions with data/information either maintained locally on the client device (108) or remotely across one or more data sources. Examples of an application (116A-116N) may include a word processor, a spreadsheet editor, a presentation editor, a database manager, a graphics renderer, a video editor, an audio editor, a web browser, a collaboration tool or platform, and an electronic mail (or email) client. Any application (116A-116N), further, is not limited to the aforementioned specific examples.

In one or many embodiment(s) disclosed herein, any application (116A-116N) may be employed by one or more organization users, which may be operating the client device (108), to achieve one or more tasks, at least in part, contingent on the specific function(s) that the application (116A-116N) may be configured to perform. Said task(s) may or may not be directed to supporting and/or achieving any short-term and/or long-term goal(s) outlined by an/the organization with which the organization user(s) may be affiliated.

In one or many embodiment(s) disclosed herein, an insight agent (118A-118N) may represent a computer program, or a collection of computer instructions, configured to perform any number of tasks in support, or as extensions, of the capabilities or functionalities of the insight service (106) (described above) (see e.g., FIG. 1A). With respect to their assigned application (116A-116N), examples of said tasks, which may be carried out by a given insight agent (118A-118N), may include: detecting an initiation of their assigned application (116A-116N) by the organization user(s) operating the client device (108); monitoring any engagement (or interaction), by the organization user(s), with their assigned application (116A-116N) following the detected initiation thereof; identifying certain engagement/interaction actions, performed by the organization user(s), based on said engagement/interaction monitoring; executing any number of procedures or algorithms, relevant to one or more insight service (106) capabilities/functionalities, in response to one or more of the identified certain engagement/interaction actions; providing periodic and/or on-demand telemetry to the insight service (106), where said telemetry may include, for example, data/information requiring processing or analysis to be performed on/by the insight service (106); and receive periodic and/or on-demand updates (and/or instructions) from the insight service (106). Further, the tasks carried out by any insight agent (118A-118N) are not limited to the aforementioned specific examples.

While FIG. 1B shows a configuration of components and/or subcomponents, other client device (108) configurations may be used without departing from the scope disclosed herein. For example, in one or many embodiment(s) disclosed herein, not all of the application(s) (116A-116N), executing on the client device (108), may host or include an insight agent (118A-118N). That is, in said embodiment(s), an insight agent (118A-118N) may not be assigned to or associated with any of at least a subset of the application(s) (116A-116N) installed on the client device (108).

Figure 2A:
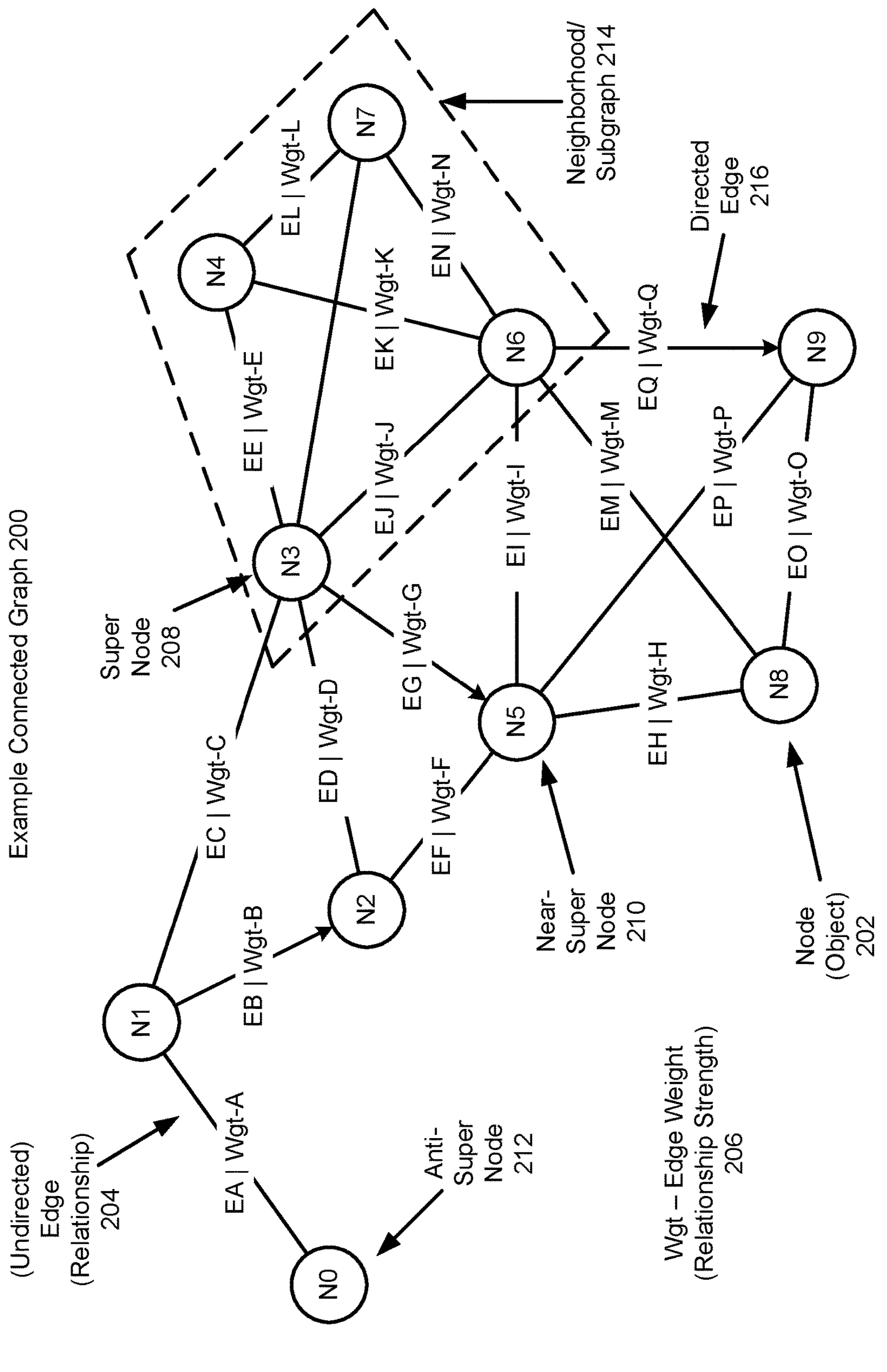
FIG. 2A shows an example connected graph in accordance with one or more embodiments disclosed herein.

FIG. 2A shows an example connected graph in accordance with one or more embodiments disclosed herein. A connected graph (200), as disclosed herein, may refer to a set of nodes (202) (denoted in the example by the circles labeled N0, N1, N2, . . . , N9) interconnected by a set of edges (204, 216) (denoted in the example by the lines labeled EA, EB, EC, . . . , EQ between pairs of nodes). Each node (202) may represent or correspond to an object (e.g., a catalog entry, a record, specific data/information, a person, etc.) whereas each edge (204, 216), between or connecting any pair of nodes, may represent or correspond to a relationship, or relationships, associating the objects mapped to the pair of nodes. A connected graph (200), accordingly, may reference a data structure that reflects associations amongst any number, or a collection, of objects.

In one or many embodiment(s) disclosed herein, each node (202), in a connected graph (200), may also be referred to herein, and thus may serve, as an endpoint (of a pair of endpoints) of/to at least one edge (204). Further, based on a number of edges connected thereto, any node (202), in a connected graph (200), may be designated or identified as a super node (208), a near-super node (210), or an anti-super node (212). A super node (208) may reference any node where the number of edges, connected thereto, meets or exceeds a (high) threshold number of edges (e.g., six (6) edges). A near-super node (210), meanwhile, may reference any node where the number of edges, connected thereto, meets or exceeds a first (high) threshold number of edges (e.g., five (5) edges) yet lies below a second (higher) threshold number of edges (e.g., six (6) edges), where said second threshold number of edges defines the criterion for designating/identifying a super node (208). Lastly, an anti-super node (212) may reference any node where the number of edges, connected thereto, lies below a (low) threshold number of edges (e.g., two (2) edges).

In one or many embodiment(s) disclosed herein, each edge (204, 216), in a connected graph (200), may either be designated or identified as an undirected edge (204) or, conversely, as a directed edge (216). An undirected edge (204) may reference any edge specifying a bidirectional relationship between objects mapped to the pair of endpoints (i.e., pair of nodes (202)) connected by the edge. A directed edge (216), on the other hand, may reference any edge specifying a unidirectional relationship between objects mapped to the pair of endpoints connected by the edge.

In one or many embodiment(s) disclosed herein, each edge (204, 216), in a connected graph (200), may be associated with or assigned an edge weight (206) (denoted in the example by the labels Wgt-A, Wgt-B, Wgt-C, . . . , Wgt-Q). An edge weight (206), of a given edge (204, 216), may reflect a strength of the relationship(s) represented by the given edge (204, 216). Further, any edge weight (206) may be expressed as or through a positive numerical value within a predefined spectrum or range of positive numerical values (e.g., 0.1 to 1.0, 1 to 100, etc.). Moreover, across the said predefined spectrum/range of positive numerical values, higher positive numerical values may reflect stronger relationships, while lower positive numerical values may alternatively reflect weaker relationships.

In one or many embodiment(s) disclosed herein, based on an edge weight (206) associated with or assigned to an edge (204, 216) connected thereto, any node (202), in a connected graph (200), may be designated or identified as a strong adjacent node (not shown) or a weak adjacent node (not shown) with respect to the other endpoint of (i.e., the other node connected to the node (202) through) the edge (204, 216). That is, a strong adjacent node may reference any node of a pair of nodes connected by an edge, where an edge weight of the edge meets or exceeds a (high) edge weight threshold. Alternatively, a weak adjacent node may reference any node of a pair of nodes connected by an edge, where an edge weight of the edge lies below a (low) edge weight threshold.

In one or many embodiment(s) disclosed herein, a connected graph (200) may include one or more subgraphs (214) (also referred to as neighborhoods). A subgraph (214) may refer to a smaller connected graph found within a (larger) connected graph (200). A subgraph (214), accordingly, may include a node subset of the set of nodes (202), and an edge subset of the set of edges (204, 216), that form a connected graph (200), where the edge subset interconnects the node subset.

While FIG. 2A shows a configuration of components and/or subcomponents, other connected graph (200) configurations may be used without departing from the scope disclosed herein.

Figure 2B:
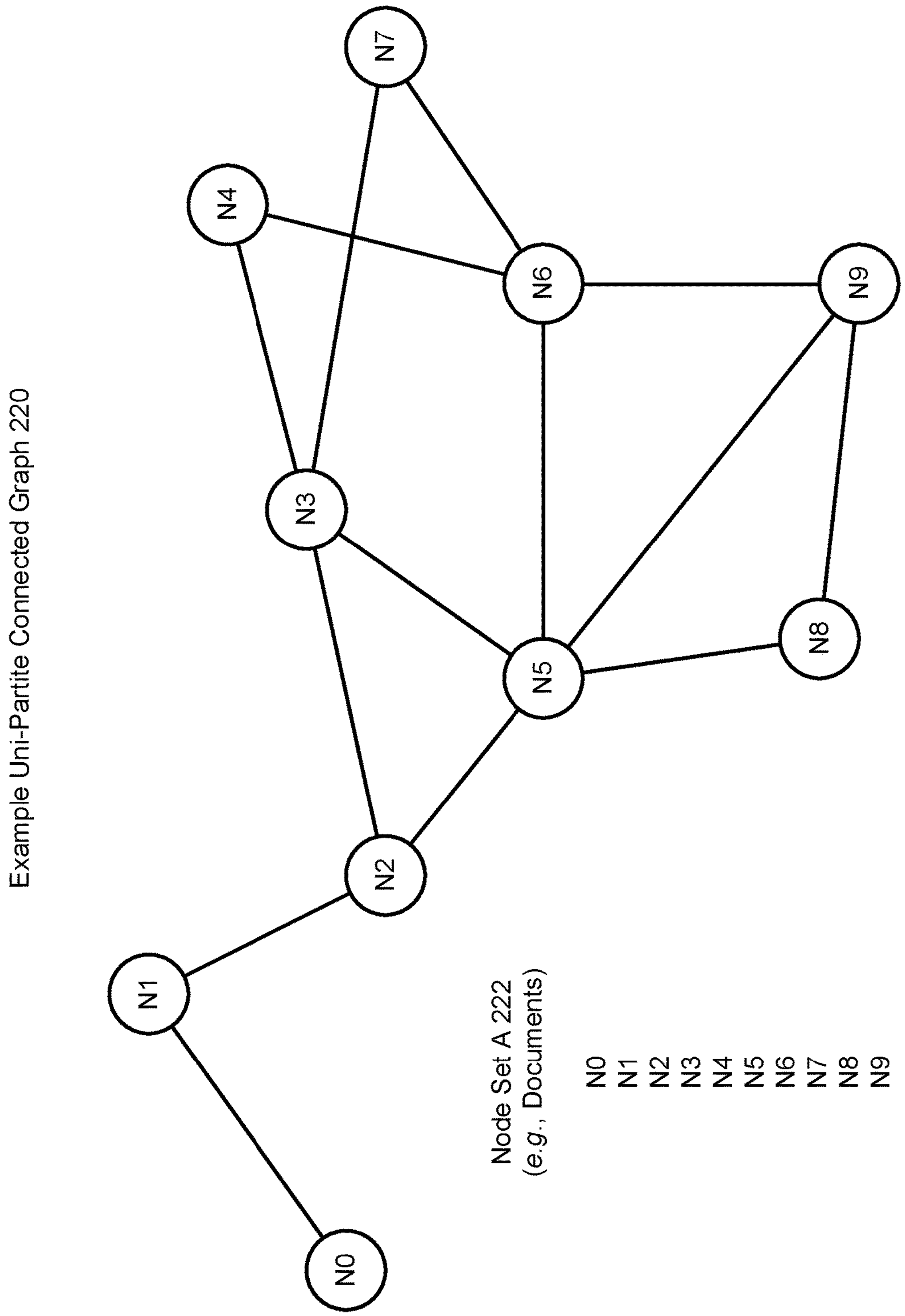
FIGS. 2B-2D show example k-partite connected graphs in accordance with one or more embodiments disclosed herein.
Figure 2C:
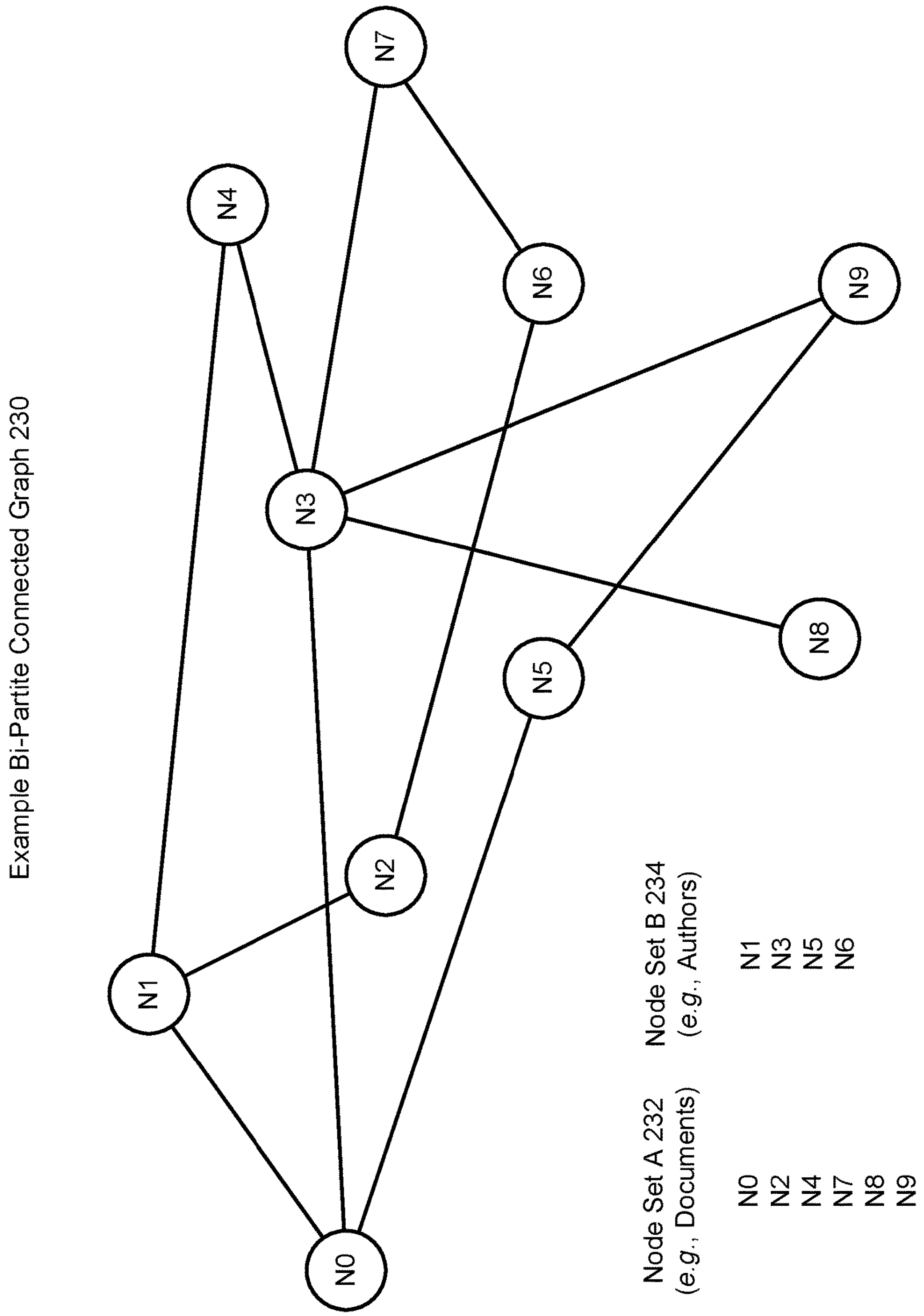
Figure 2D:
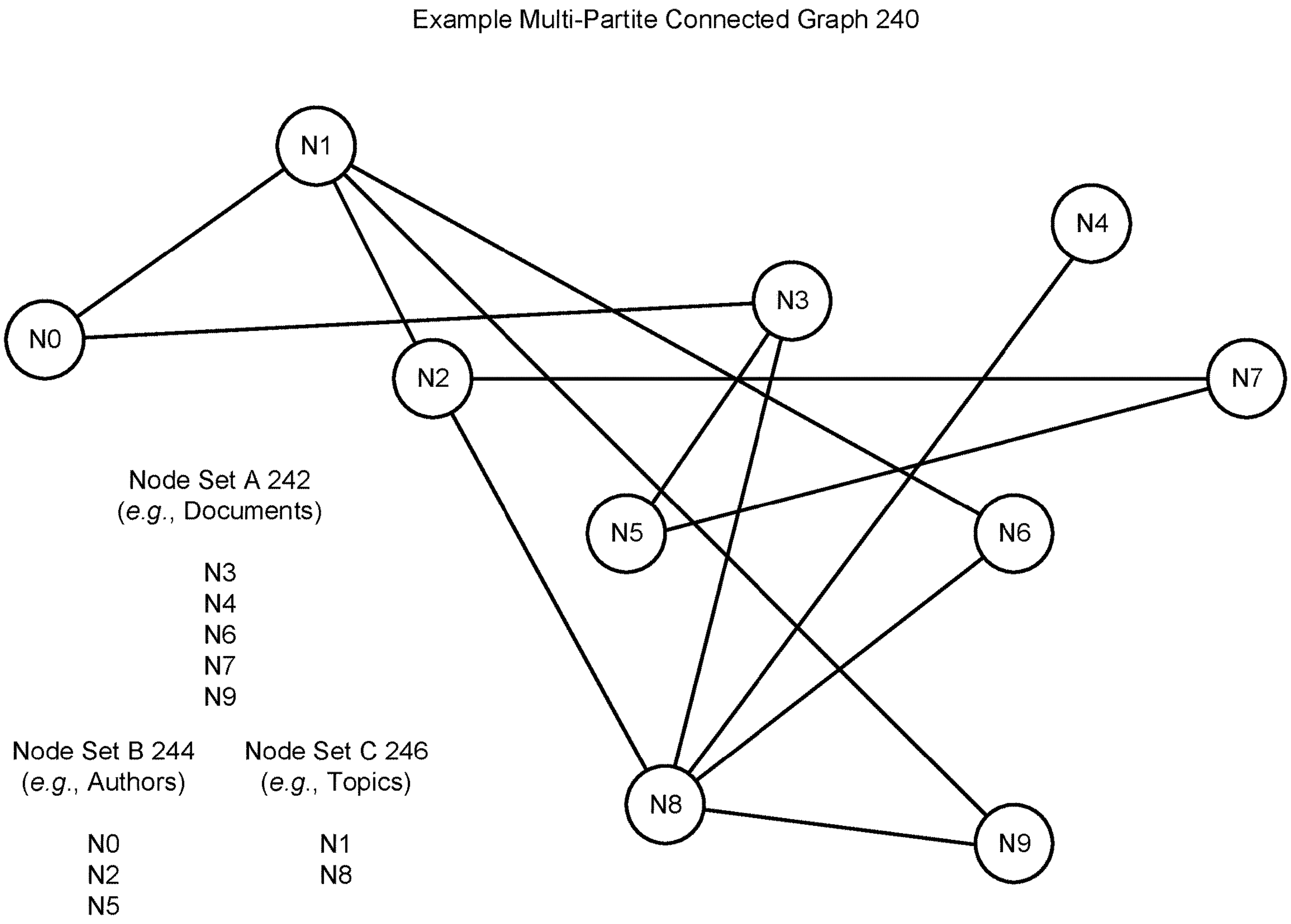

FIGS. 2B-2D show example k-partite connected graphs in accordance with one or more embodiments disclosed herein. Generally, any k-partite connected graph may represent a connected graph (described above) (see e.g., FIG. 2A) that encompasses k independent sets of nodes and a set of edges interconnecting (and thus defining relationships between) pairs of nodes: (a) both belonging to the same, single independent set of nodes in any (k=1)-partite connected graph; or (b) each belonging to a different independent set of nodes in any (k>1)-partite connected graph. Further, any k-partite connected graph, as disclosed herein, may fall into one of three possible classifications: (a) a uni-partite connected graph, where k=1; (b) a bi-partite connected graph, where k=2; or (c) a multi-partite connected graph, where k≥3.

Turning to FIG. 2B, an example uni-partite connected graph (220) is depicted. The uni-partite connected graph (220) includes one (k=1) independent set of nodes—i.e., a node set (222), which collectively maps or belongs to a single object class (e.g., documents).

Further, in the example, the node set is denoted by the circles labeled N0, N1, N2, . . . , N9. Each said circle, in the node set (222), subsequently denotes a node that represents or corresponds to a given object (e.g., a document) in a collection of objects (e.g., a group of documents) of the same object class (e.g., documents).

Moreover, the uni-partite connected graph (220) additionally includes a set of edges (denoted in the example by the lines interconnecting pairs of nodes, where the first and second nodes in a given node pair belongs to the node set (222)). Each edge, in the example, thus reflects a relationship, or relationships, between any two nodes of the node set (222) (and, by association, any two objects of the same object class) directly connected via the edge.

Turning to FIG. 2C, an example bi-partite connected graph (230) is depicted. The bi-partite connected graph (230) includes two (k=2) independent sets of nodes—i.e., a first node set (232) and a second node set (234), where the former collectively maps or belongs to a first object class (e.g., documents) whereas the latter collectively maps or belongs to a second object class (e.g., authors).

Further, in the example, the first node set (232) is denoted by the circles labeled N0, N2, N4, N7, N8, and N9, while the second node set (234) is denoted by the circles labeled N1, N3, N5, and N6. Each circle, in the first node set (232), subsequently denotes a node that represents or corresponds to a given first object (e.g., a document) in a collection of first objects (e.g., a group of documents) of the first object class (e.g., documents). Meanwhile, each circle, in the second node set (234), subsequently denotes a node that represents or corresponds to a given second object (e.g., an author) in a collection of second objects (e.g., a group of authors) of the second object class (e.g., authors).

Moreover, the bi-partite connected graph (230) additionally includes a set of edges (denoted in the example by the lines interconnecting pairs of nodes, where a first node in a given node pair belongs to the first node set (232) and a second node in the given node pair belongs to the second node set (234)). Each edge, in the example, thus reflects a relationship, or relationships, between any one node of the first node set (232) and any one node of the second node set (234) (and, by association, any one object of the first object class and any one object of the second object class) directly connected via the edge.

Turning to FIG. 2D, an example multi-partite connected graph (240) is depicted. The multi-partite connected graph (240) includes three (k=3) independent sets of nodes—i.e., a first node set (242), a second node set (244), and a third node set (246). The first node set (242) collectively maps or belongs to a first object class (e.g., documents); the second node set (244) collectively maps or belongs to a second object class (e.g., authors); and the third node set (246) collectively maps or belongs to a third object class (e.g., topics).

Further, in the example, the first node set (242) is denoted by the circles labeled N3, N4, N6, N7, and N9; the second node set (244) is denoted by the circles labeled N0, N2, and N5; and the third node set (246) is denoted by the circles labeled N1 and N8. Each circle, in the first node set (242), subsequently denotes a node that represents or corresponds to a given first object (e.g., a document) in a collection of first objects (e.g., a group of documents) of the first object class (e.g., documents). Meanwhile, each circle, in the second node set (244), subsequently denotes a node that represents or corresponds to a given second object (e.g., an author) in a collection of second objects (e.g., a group of authors) of the second object class (e.g., authors). Lastly, each circle, in the third node set (246), subsequently denotes a node that represents or corresponds to a given third object (e.g., a topic) in a collection of third objects (e.g., a group of topics) of the third object class (e.g., topics).

Moreover, the multi-partite connected graph (240) additionally includes a set of edges (denoted in the example by the lines interconnecting pairs of nodes, where a first node in a given node pair belongs to one object class from the three available object classes, and a second node in the given node pair belongs to another object class from the two remaining object classes (that excludes the one object class to which the first node in the given node pair belongs)). Each edge, in the example, thus reflects a relationship, or relationships, between any one node of one object class (from the three available object classes) and any one node of another object class (from the two remaining object class excluding the one object class) directly connected via the edge.

Figure 3:
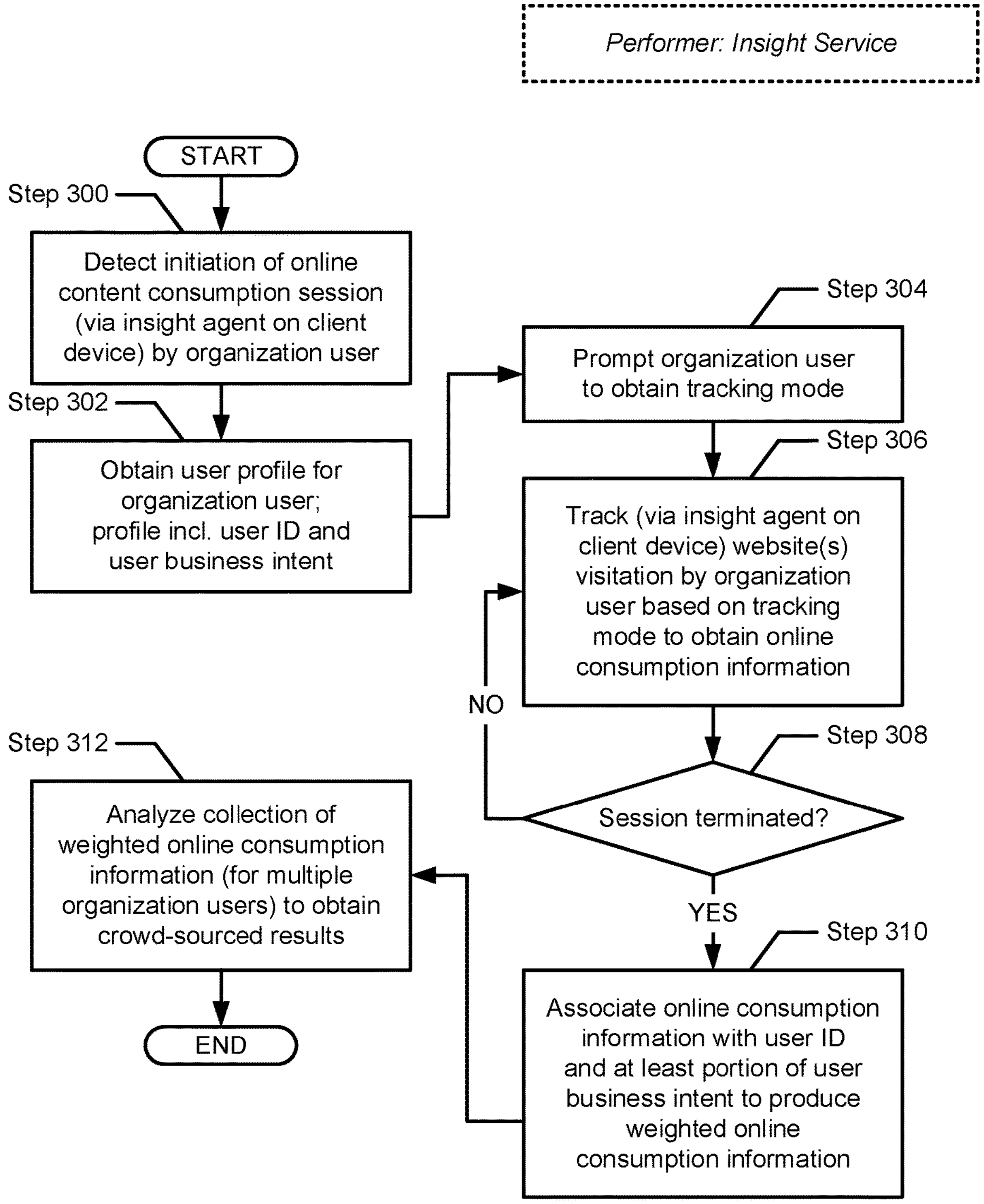
FIG. 3 shows a flowchart describing a method for crowd-sourced research relevance tracking and analytics in accordance with one or more embodiments disclosed herein.

FIG. 3 shows a flowchart describing a method for crowd-sourced research relevance tracking and analytics in accordance with one or more embodiments disclosed herein. The various steps outlined below may be performed by an insight service (see e.g., FIG. 1A). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, an initiation of an online content consumption session, by an organization user, is detected. In one or many embodiment(s) disclosed herein, the online content consumption session may refer to a given time frame within which the content consumption of one or more online resources (e.g., webpage(s)), by the organization user, transpires. Content consumption, in turn, may refer to the activity of absorbing, or interacting with, any content (e.g., reading text, viewing images, watching/listening to multimedia, etc.) presented through said online resource(s). Further, detection of the initiation of the online content consumption session may, for example, involve the receiving of telemetry from one or more insight agents (see e.g., FIG. 1B) executing on a client device operated by the organization user. The insight agent(s) may be embedded within, or may otherwise be associated with, one or more software applications (e.g., web browser(s)) also executing on the client device and configured to enable the organization user to access any online resource(s) visited/viewed by the organization user during the online content consumption session.

In Step 302, a user profile is obtained. In one or many embodiment(s) disclosed herein, the user profile may pertain to the organization user whom initiated the online content consumption session (detected in Step 300). The user profile may refer to a collection of settings and information associated with the organization user. As such, the user profile may include, but is not limited to, a user identifier (ID) and a user business intent.

In one or many embodiment(s) disclosed herein, the user ID may reflect a character string that uniquely identifies the organization user. The character string may be of any arbitrary length and may be formed from any combination or order of characters, where each character may be represented, for example, by an alphabetic letter, a whole number, or a non-alphanumeric symbol.

In one or many embodiment(s) disclosed herein, the user business intent may refer to information, respective to the organization user, which may pertain to or describe the engagement of the organization user within and/or outside their organization (e.g., a commercial business, an education institute, etc.). The user business intent, further, may be represented through a set of business intent parameters. Examples of said business intent parameter(s) (as they pertain to any given organization user) may include, but is/are not limited to: one or more user organization roles (e.g., title(s) and/or position(s)) within an organization that may be associated with the given organization user; one or more other organization users within the organization with which the given organization user interacts and/or had interacted; one or more suppliers, distributors, customers, collaborators, and/or other actors outside the organization (also collectively referred to herein as one or more value networks) with which the given organization user interacts and/or had interacted; a search query history reflecting one or more past search queries, as well as the search topic(s) entailed, which had been previously submitted by the given organization user; one or more organization departments of the organization with which the given organization user is associated; one or more organization responsibilities (e.g., assigned project(s) or task(s)) within the organization that the given organization user is currently undertaking or had undertaken in the past; and one or more success metrics indicating a level of success that the aforementioned organization responsibility/responsibilities have brought to the organization. Said business intent parameter(s) is/are not limited to the aforementioned specific examples.

In Step 304, the organization user, whom initiated the online content consumption session (detected in Step 300), is prompted to perform a selection. In one or many embodiment(s) disclosed herein, said selection may pertain to a tracking mode for governing an extent to which the online activities of the organization user may be tracked throughout the online content consumption session. The selected tracking mode, accordingly, may dictate a behavior of the insight agent(s) executing on the client device operated by the organization user, as well as a quantity and/or quality of the telemetry (e.g., online consumption information (described below)) received therefrom.

By way of an example, and in one or many embodiment(s) disclosed herein, the selected tracking mode may be reflective of an open tracking mode. In such embodiment(s), the open tracking mode may permit the insight agent(s), monitoring any engagement of the organization user with any online resource(s), to collect online consumption information freely without, or with minimal, consent and/or intervention from the organization user. To that end, in operating under the open tracking mode, the insight agent(s) may include functionality to: extract any granularity of content from any online resource (e.g., webpage) visited by the organization user; generate, for any given visited online resource, a metadata file including, for example, a summary of the content presented on the given visited online resource, a universal resource locator (URL) associated with the given visited online resource, and one or more engagement metrics (e.g., time spent on the given visited online resource, etc.); transmit, for any given visited online resource, the generated metadata file to the insight service for processing and/or analysis; and extract (or copy) and forward any embedded media files or other non-webpage (e.g., non-hypertext markup language (HTML)) content to the insight service. Further, while operating in the open tracking mode, the insight agent(s) may perform other functionalities without departing from the scope disclosed herein.

By way of another example, and in one or many other embodiment(s) disclosed herein, the selected tracking mode may alternatively be reflective of a private tracking mode. In such other embodiment(s), the private tracking mode may constrain (or limit) the insight agent(s), monitoring any engagement of the organization user with any online resource(s), to freely operate. To that end, in operating under the private tracking mode, the insight agent(s) may include functionality to: remain on standby until consent by the organization user is provided by way of, for example, the manual opting (e.g., via engagement with a plug-in interface) to upload a given visited online resource (or any granularity of content thereof) to the insight service; and only upon detecting that the organization user has consented (or opted) to upload the given visited online resource (or any granularity of content thereof), then: extract any granularity of content from the given visited online resource; generate, for the given visited online resource, a metadata file including, for example, a summary of the content presented on the given visited online resource, a universal resource locator (URL) associated with the given visited online resource, and one or more engagement metrics (e.g., time spent on the given visited online resource, etc.); and transmit, for the given visited online resource, the generated metadata file to the insight service for processing and/or analysis. Should the content granularity selected for upload, by the organization user, specify any embedded media files or other non-webpage (e.g., non-hypertext markup language (HTML)) content, the insight agent(s) may also include functionality to extract (or copy) and subsequently forward said embedded media files and/or non-webpage content to the insight service. Further, while operating in the private tracking mode, the insight agent(s) may perform other functionalities without departing from the scope disclosed herein.

In one or many embodiment(s) disclosed herein, while operating in any selected tracking mode, and should a data/content scraping policy be enabled, the insight agent(s) may include further functionality to: search for, locate, and analyze any digital entitlement notification (or terms of use) indicated on any given visited online resource; based on the analysis of the digital entitlement notification (or terms of use) indicating the allowance of any data/content scraping, proceed with the scraping of any said granularity of data or content presented on the given visited online resource either automatically (while operating in the open tracking mode) or following consent by the organization user (while operating in the private tracking mode); and, alternatively, based on the analysis of the digital entitlement notification (or terms of use) indicating the denial of any data/content scraping: refrain from scraping any said granularity of data or content presented on the given visited online resource (while operating in either the open or private tracking mode); instead, prompt the organization user to activate a printing feature in any software application (e.g., web browser), employed by the organization user to access the given visited online resource, in order to obtain a digital document (in any existing exportable format—e.g., portable document format (PDF), etc.); and, subsequently, forward said obtained digital document, representative of the data/content (or at least a portion thereof) on the given visited online resource, to the insight service for storage and/or analysis. Further, while operating in any selected tracking mode, and should a data/content scraping policy be enabled, the insight agent(s) may perform other functionalities without departing from the scope disclosed herein.

In one or many embodiment(s) disclosed herein, while operating in any selected tracking mode, the insight agent(s) may include further functionality to: implement, and thus provide to the organization user, a content relevance feature whereby the organization user may flag any granularity of content on any visited online resource. In performing said flagging, the organization user may indicate a level of relevance or importance of the flagged content to them in one or more capacities (e.g., personal interest(s), professional work/project(s), subject matter expert domain(s), etc.). Further, any flagged content may be relayed, by the insight agent(s), to the insight service for trend and/or other crowdsourcing analyses.

In Step 306, the visitation of one or more online resources (or any engagement therewith), by the organization user, is tracked based on the tracking mode (selected by the organization user in Step 304). In one or many embodiment(s) disclosed herein, said tracking of any online resource visitation(s), based on the selected tracking mode, may transpire as described above regarding the functionalities of the insight agent(s).

Furthermore, in one or many embodiment(s) disclosed herein, online consumption information may be obtained from the result of said online resource visitation(s) tracking. Online consumption information may refer to any content and/or metadata collected, by one or more insight agents, throughout an online content consumption session; and that represents the content consumption (defined above) of the organization user during said online content consumption session. By way of examples, and as already mentioned above, online consumption information may include, but is not limited to: for any given visited online resource, a metadata file including, for example, a summary of the content presented on the given visited online resource, a universal resource locator (URL) associated with the given visited online resource, and one or more engagement metrics (e.g., time spent on the given visited online resource, etc.); for any given visited online resource, any embedded media files or other non-webpage (e.g., non-hypertext markup language (HTML)) content; and any annotations or tags (e.g., levels of content relevance or importance) associated with content flagged by the organization user. Further, online consumption information is not limited to the aforementioned specific examples.

In Step 308, a determination is made as to whether the online content consumption session (an initiation thereof detected in Step 300) has been terminated by the organization user. Said determination may entail detecting, via the insight agent(s) executing on the client device operated by the organization user, a closure of any software application(s) (e.g., web browser(s)) enabling the organization user to access one or more online resources. As such, in one or many embodiment(s) disclosed herein, if it is determined that the online content consumption session has indeed been terminated, then the method proceeds to Step 310. On the other hand, in one or many other embodiment(s) disclosed herein, if it is alternatively determined that the online content consumption session has yet to be terminated, then the method alternatively proceeds to Step 306, where additional online consumption information may be obtained through additional tracking of online resource visitation(s) by the organization user.

In Step 310, following the determination (made in Step 308) that the online content consumption session (an initiation thereof detected in Step 300) has been terminated by the organization user, weighted online consumption information is produced. In one or many embodiment(s) disclosed herein, any weight, applicable to given information, may generally reference a statistical adjustment (e.g., typically expressed as a positive numerical value) reflective of an assigned level of significance that said given information holds with respect to the analysis at least thereof being performed and the other information also being considered in said analysis. Weighted online consumption information, accordingly, may refer to the online consumption information (obtained in Step 306) to which a weight has been impressed.

Further, in one or many embodiment(s) disclosed herein, a value of said weight, and thus a level of significance applied to the online consumption information, may be determined based on at least a portion of the user business intent (obtained in Step 302) for the organization user. More specifically, a semantic similarity calculation (e.g., a natural language processing (NLP) technique) may be performed between the online consumption information (obtained in Step 306) and the user business intent, to obtain a semantic similarity score. The semantic similarity score, in turn, may: reflect a likeness of (or a similarity between) the meanings respective to the content in the online consumption information and the content in the user business intent; and, further, may be expressed as a positive numerical value (e.g., within a 0.0 to 1.0 range) where 0.0 may reflect that the online consumption information and the user business intent have no/zero similarities between their respective meanings, and where 1.0 may conversely reflect that the online consumption information and the user business intent match each other regarding their respective meanings. The weight, assigned to online consumption information (thereby producing the weighted online consumption information), may be a value proportional to the semantic similarity score. Thereafter, the weighted online consumption information may be stored until an analysis, or analyses, thereof may be conducted (see e.g., Step 312).

In Step 312, a collection of weighted online consumption information is analyzed. In one or many embodiment(s) disclosed herein, the collection of weighted online consumption information may include the weighted online consumption information (produced in Step 310) for multiple organization users. Said multiple organization users may share one or more similar aspects of their respective user business intent (e.g., each may belong to a common professional occupation, share similar domain(s)/interest(s), interact with the same value network(s), etc.) or, alternatively, may exemplify substantially different user business intents. Further, the analysis/analyses performed may, for example, relate to existing algorithms (e.g., keyword analytics, popularity metrics, etc.) employed to predict or identify emergent trends (or topics of interests) across one or more research and/or professional domains/areas (and/or subdomains/subareas) with which the multiple organization users may be knowledgeable or of which the multiple organization users may be considered subject matter experts. Moreover, through said analysis/analyses of the collection of weighted online consumption information, crowd-sourced results may be obtained.

Figure 4:
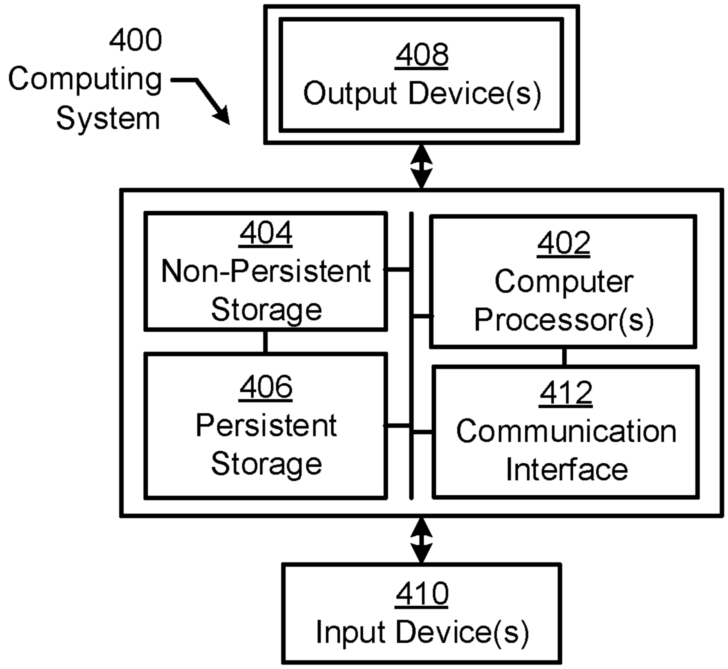
FIG. 4 shows an example computing system in accordance with one or more embodiments disclosed herein.

FIG. 4 shows an example computing system in accordance with one or more embodiments disclosed herein. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment disclosed herein, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5A:
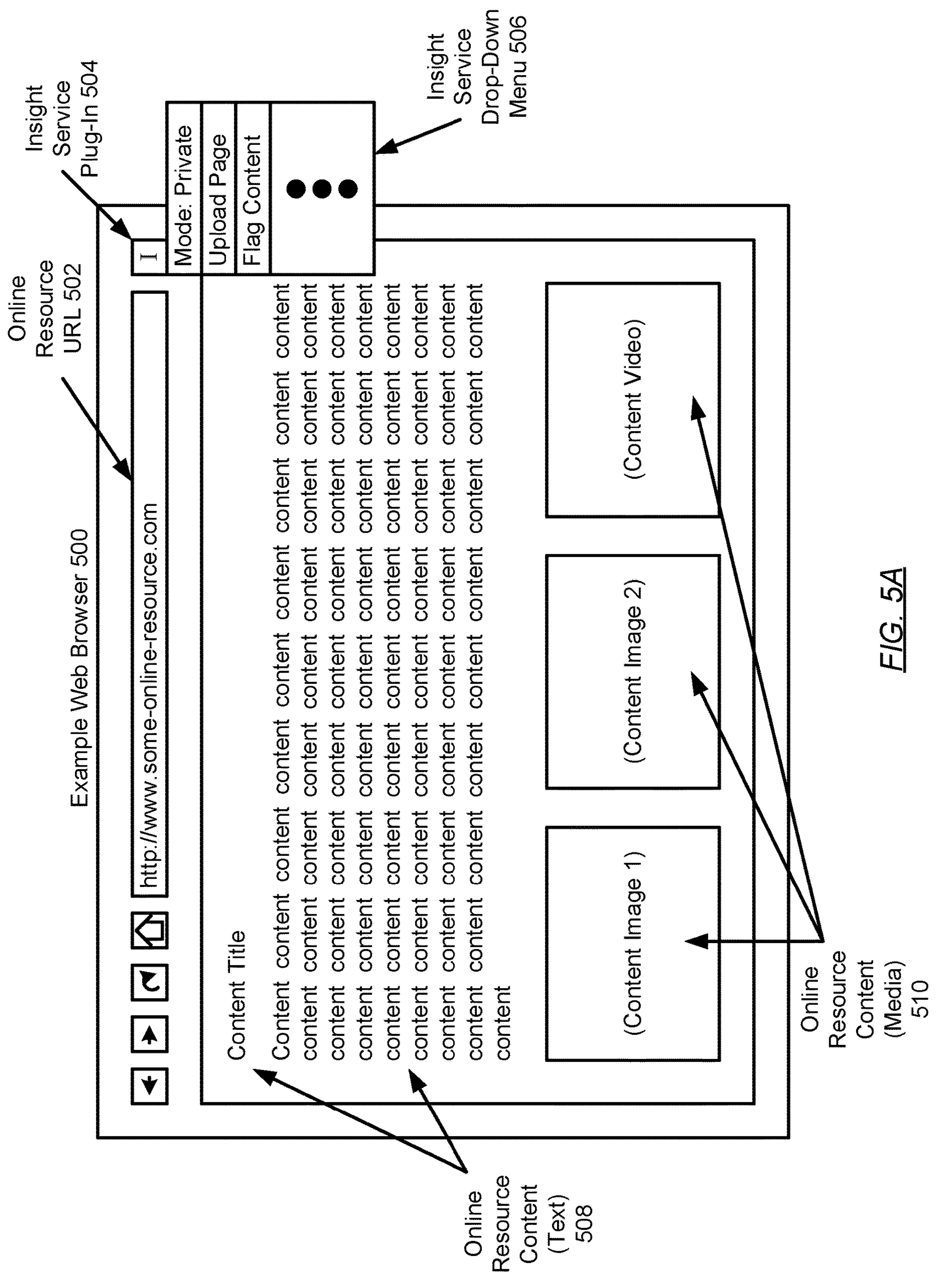
FIG. 5A shows an example web browser in accordance with one or more embodiments disclosed herein.

FIG. 5A shows an example web browser in accordance with one or more embodiments disclosed herein. The example web browser, illustrated through FIG. 5A and described below, is explanatory purposes only and not intended to limit the scope disclosed herein.

The example web browser (500) may exemplify a software application or program configured to enable access to any online resource(s) (e.g., one or more webpages). In the simplest of representations, the example web browser (500) includes: various interactive buttons (e.g., a reverse to a previously visited webpage button, a forward to a next visited webpage button, a reload a current webpage button, a go to a home webpage button, and an access features of an insight service plug-in (504) button); an editable address bar where the universal resource locator (URL) (502) of any online resource may be entered; and a content window through which any given online resource (or more specifically, the content respective thereof) may be viewed or interacted with. Said content (also referred to herein as online resource content) may refer to information presented in one or more content formats—e.g., text, tables, images, videos, animations, audio, etc. Online resource content, depicted in the text (508) and media (i.e., image and video) (510) forms, is exemplified here in the content window of the example web browser (500).

The example web browser (500) further includes, or may integrate, an insight service plug-in (504). A plug-in, when installed within a web browser, may generally refer to software that adds extra functionality or feature(s) to any existing functionality/feature(s) of the web browser. To that extent, the insight service plug-in (504) may reference functionality-extending software that facilitates online content consumption session tracking as disclosed herein. More specifically, when activated (via interaction by an organization user), the insight service plug-in (504) presents an insight service drop-down menu (506). The insight service drop-down menu (506), in turn, reveals a list of options representative of a set of features pertinent to online content consumption session tracking. Said options may include, but are not limited to: a 'tracking mode' (e.g., open or private) button, which when interacted with by the organization user, governs a behavior of an insight agent, at least concerning the collection of online consumption information thereby, based on the tracking mode opted by the organization user; when a private tracking mode has been selected, an 'upload page' button, which when interacted with by the organization user, enables the transmission of any online resource content (508, 510) (or any selected portion thereof), of a currently viewed/visited online resource, to the insight service (not shown) for storage and/or analysis; and a 'flag content' button, which when interacted with by the organization user, enables the organization user to indicate a level of relevance or importance associated with any online resource content (508, 510) (or any selected portion thereof) of a currently viewed/visited online resource.

FIGS. 5B-5L show example scenarios in accordance with one or more embodiments disclosed herein. The example scenarios, illustrated through FIGS. 5B-5L and described below, are for explanatory purposes only and not intended to limit the scope disclosed herein.

A first example scenario (illustrated and described with respect to FIGS. 5B-5F, below) considers an organization user, identified as Lucy, whom opts to peruse online content via an open tracking mode. While operating under the open tracking mode, an insight agent, executing on a client device belonging to Lucy, freely collects online consumption information without (or with minimal) intervention from Lucy. Conversely, a second example scenario (illustrated and described with respect to FIGS. 5F-5L) considers another organization user, identified as Beth, whom alternatively opts to peruse online content via a private tracking mode. While operating under the private tracking mode, another insight agent, executing on another client device belonging to Beth, collects online consumption information only following manual commands from Beth.

Through the disclosed capability of crowd-sourced research relevance tracking and analytics, the online activities of both Lucy and Beth are monitored, captured (albeit differently due to their respective opted tracking mode), and subsequently analyzed to produce crowd-sourced results. Interactions amongst various actors—e.g., an Insight Agent on a Client Device A (520) operated by Lucy, an Insight Agent on a Client Device B (522) operated by Beth, and the Insight Service (524)—are illustrated in conjunction with components shown across FIGS. 5B-5L and described (in an itemized manner) below. Said interactions, as well as processes performed on/by any particular actor may follow embodiments disclosed herein pertaining to crowd-sourced research relevance tracking and analytics as applied to the circumstances of the example scenarios.

Figure 5B:
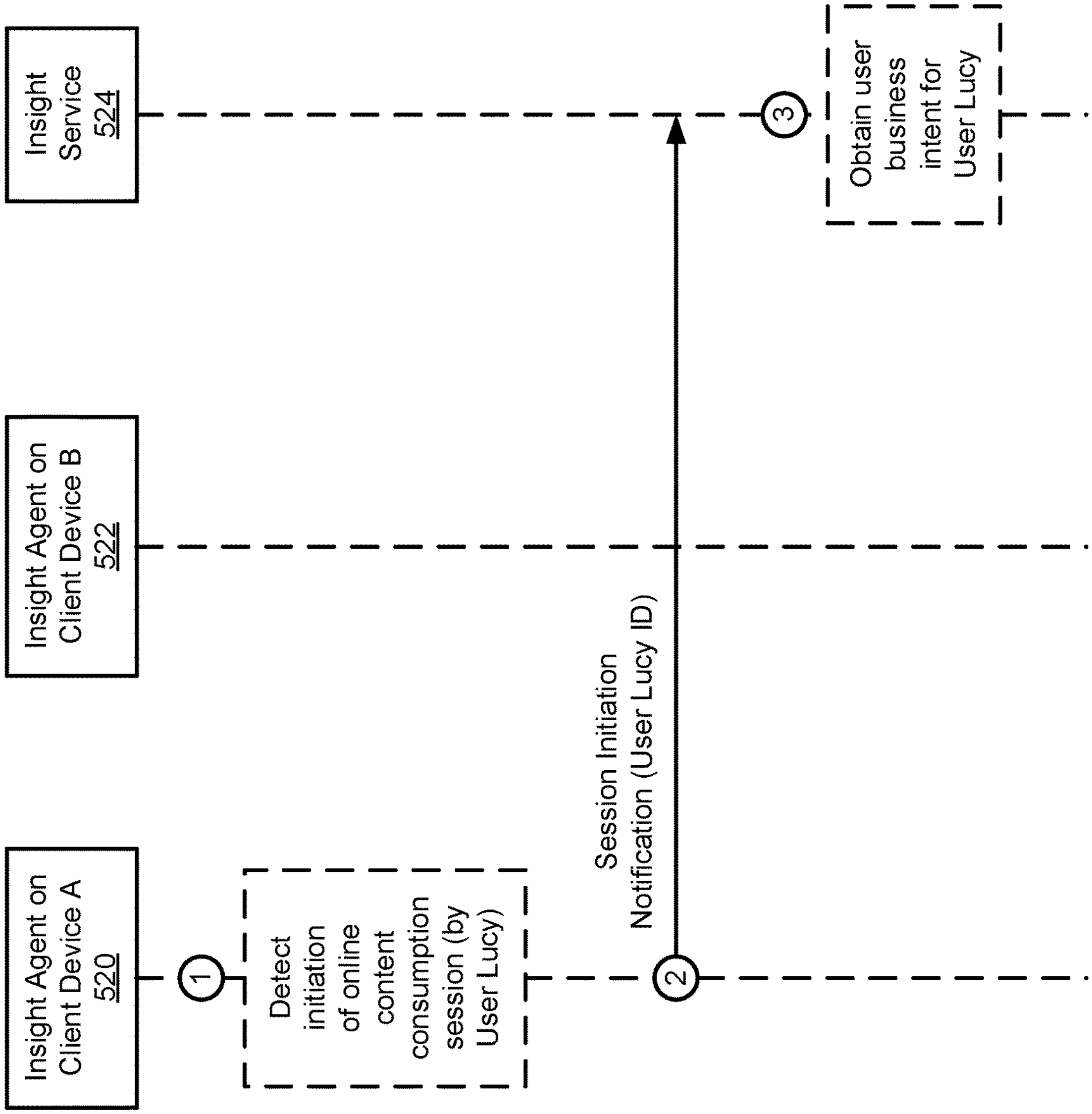
Figure 5C:
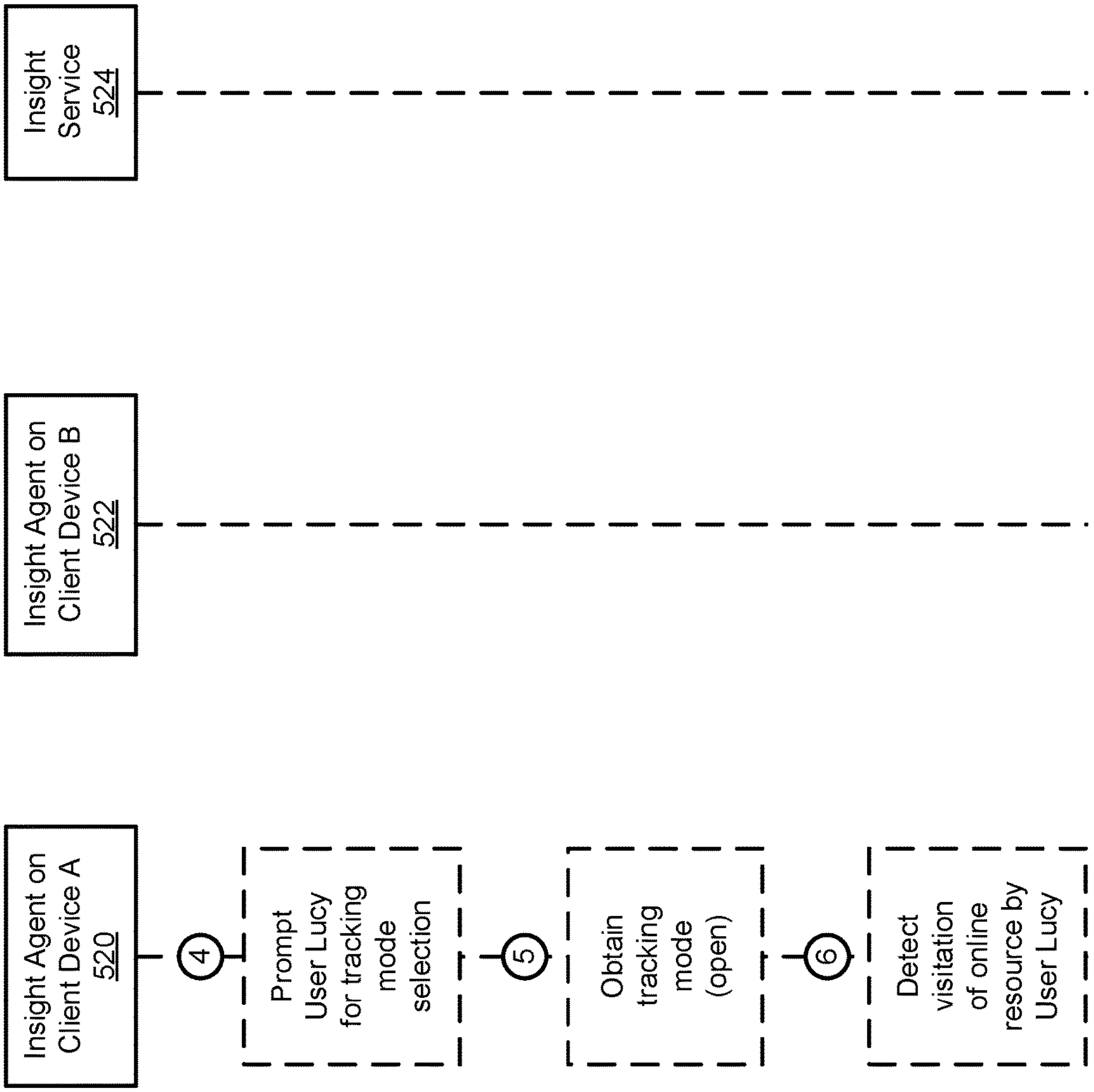
Figure 5D:
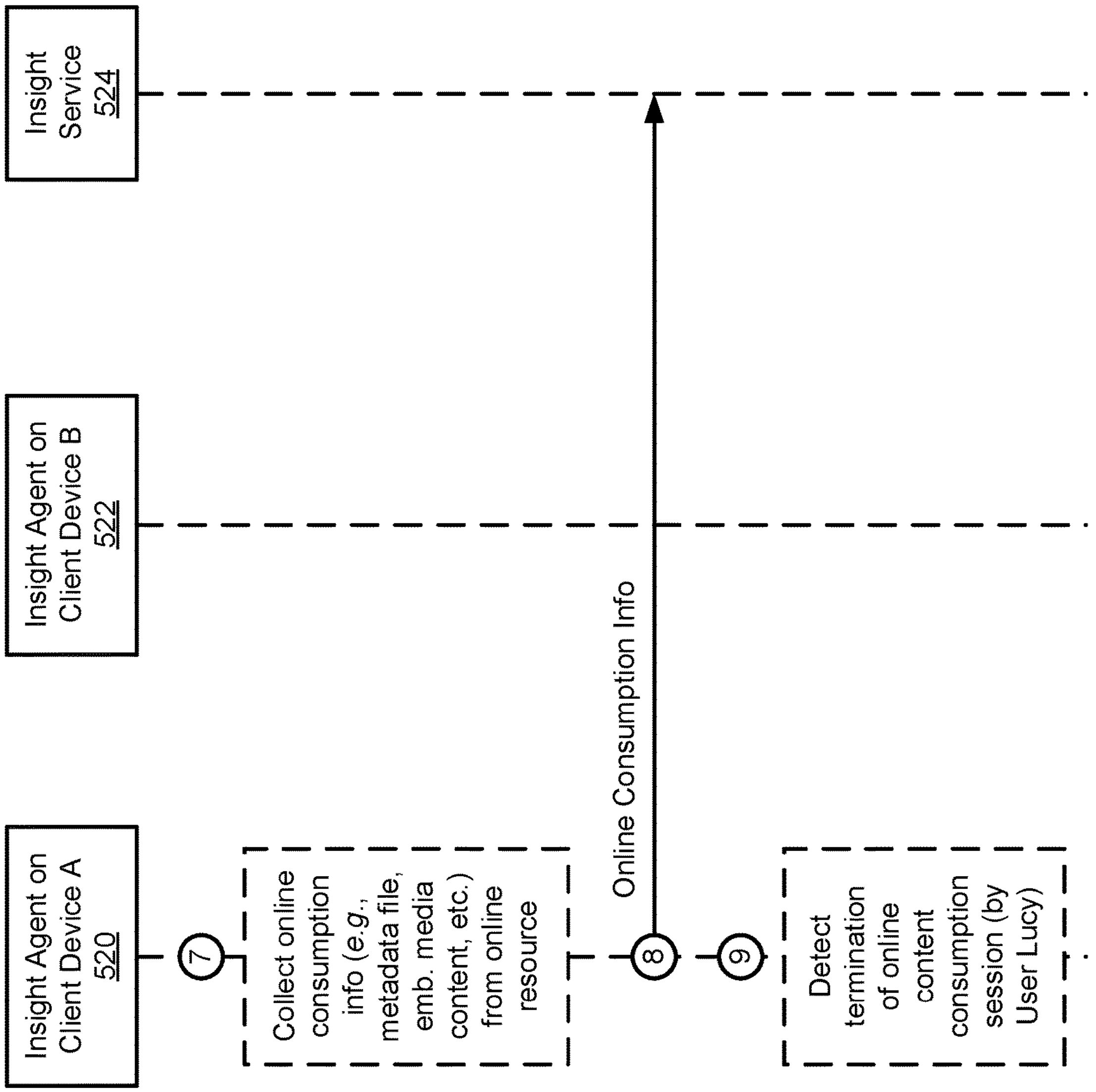
Figure 5E:
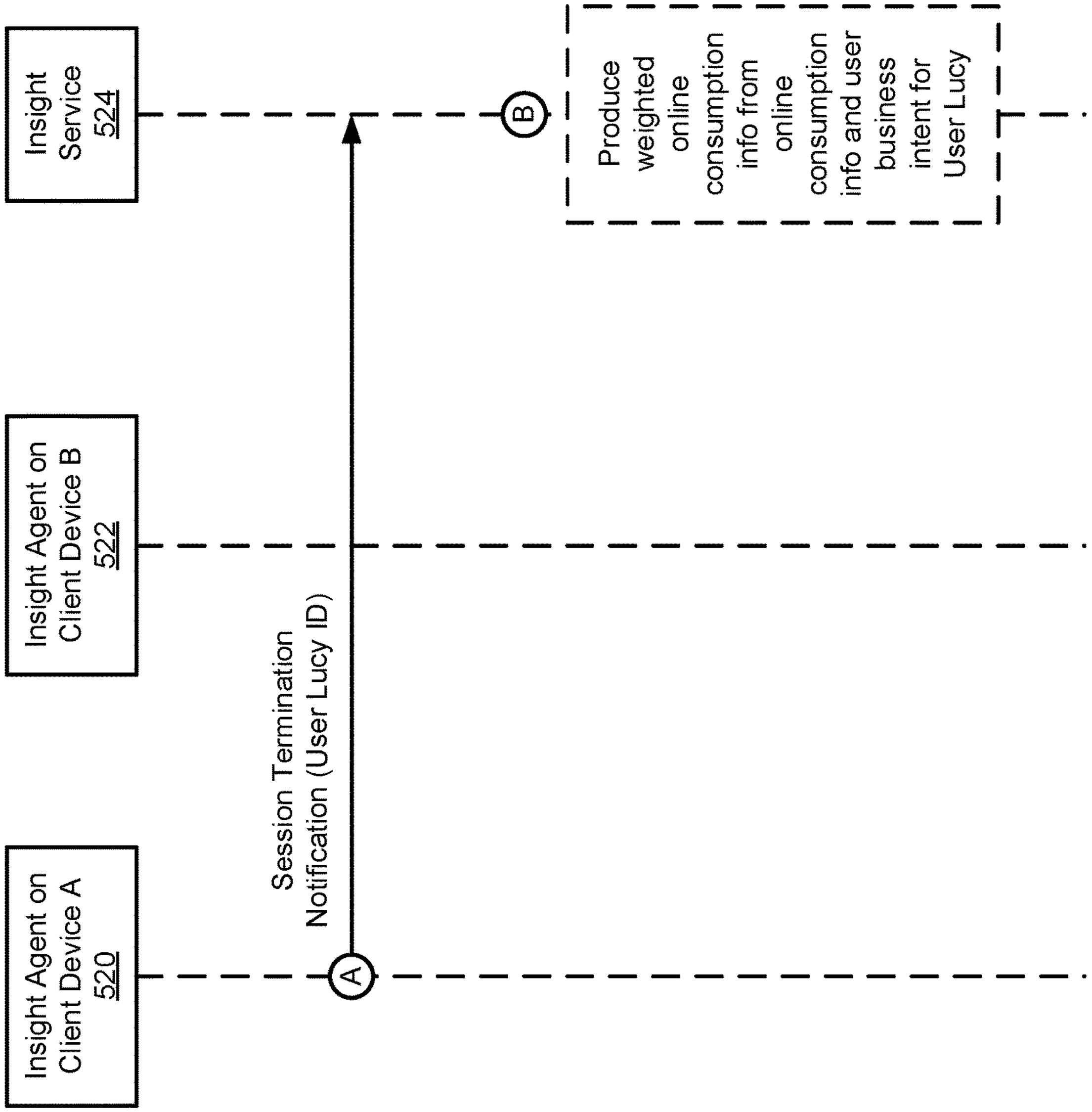
Figure 5E:
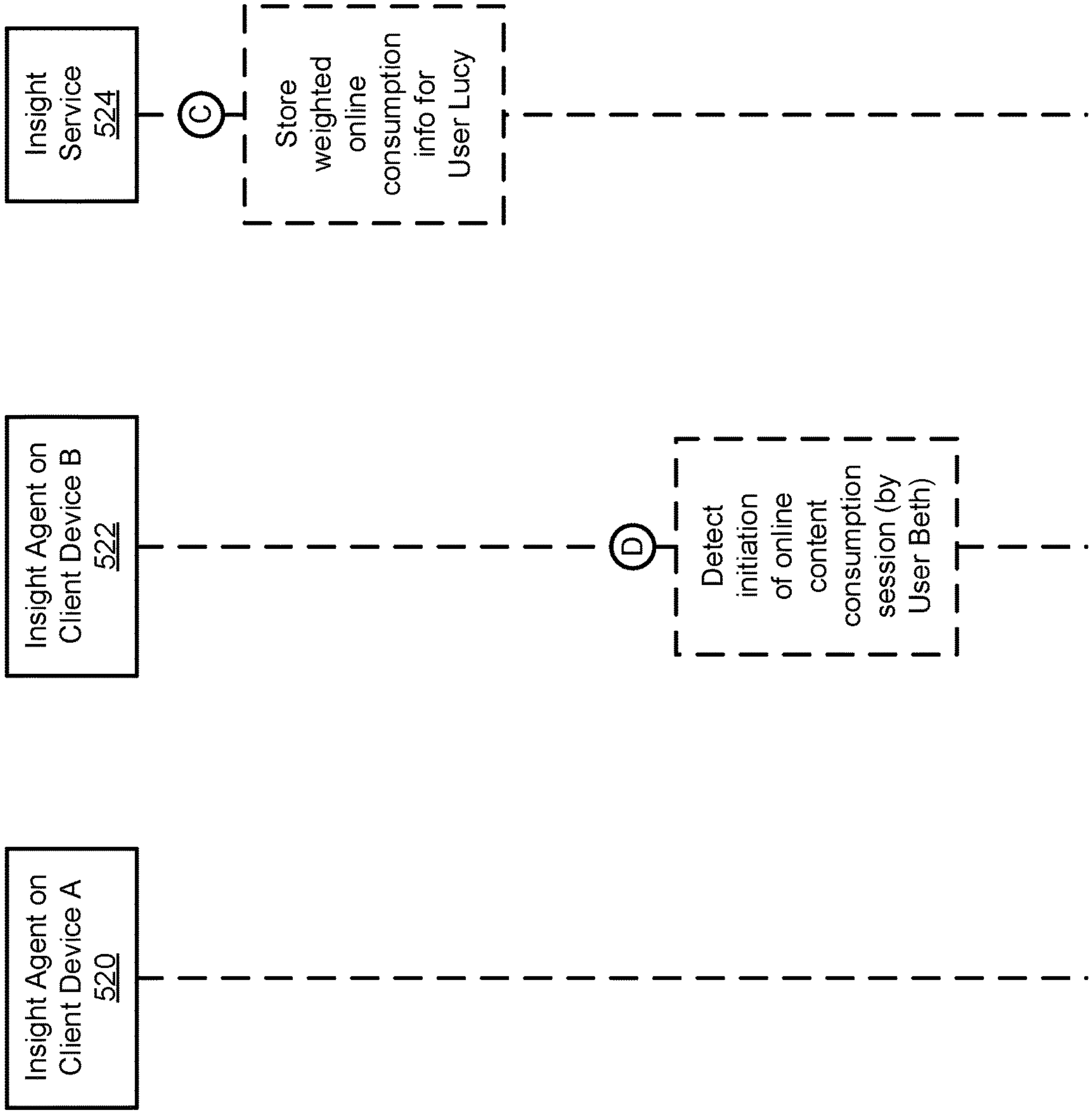
Figure 5G:
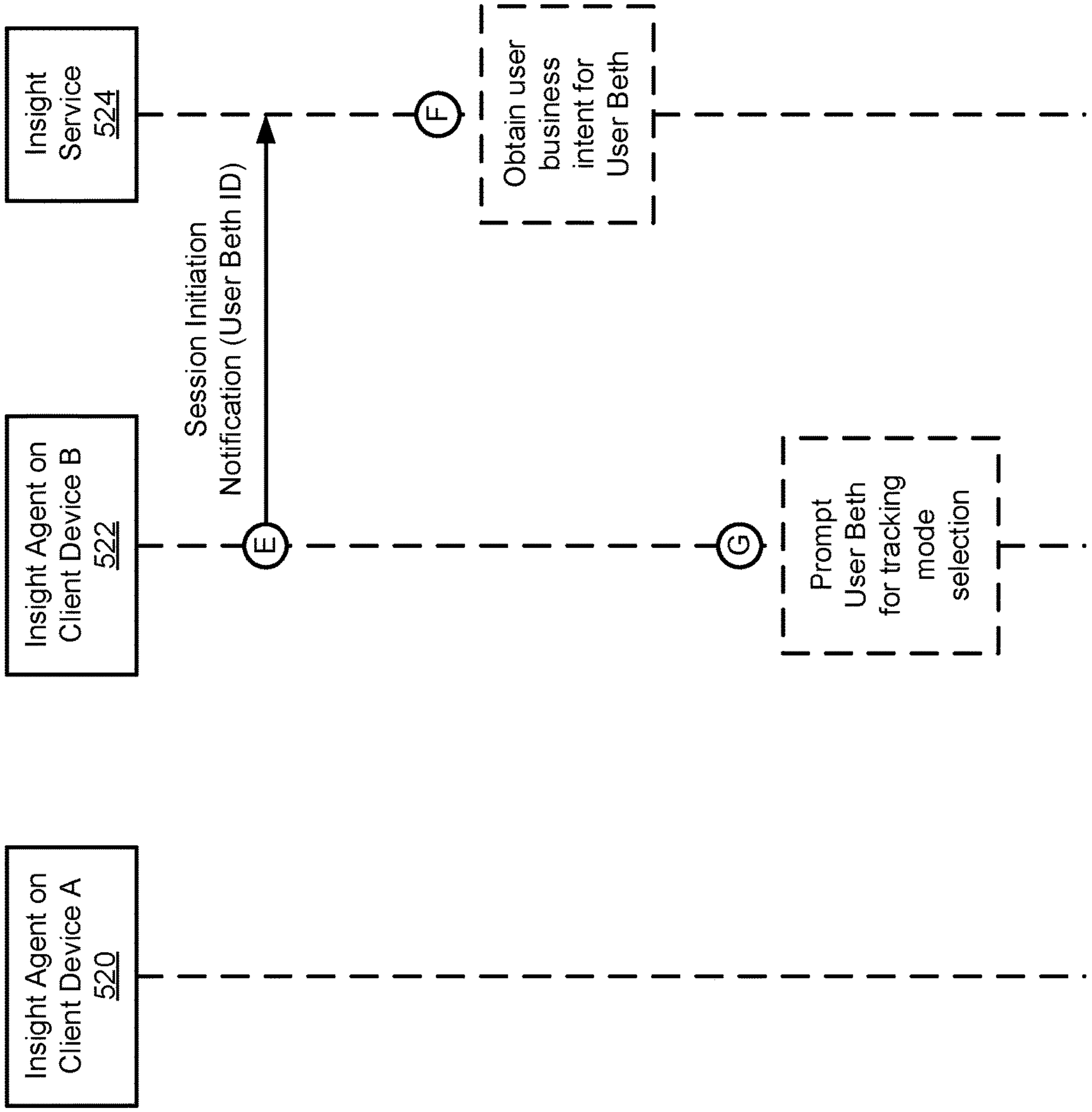
Figure 5H:
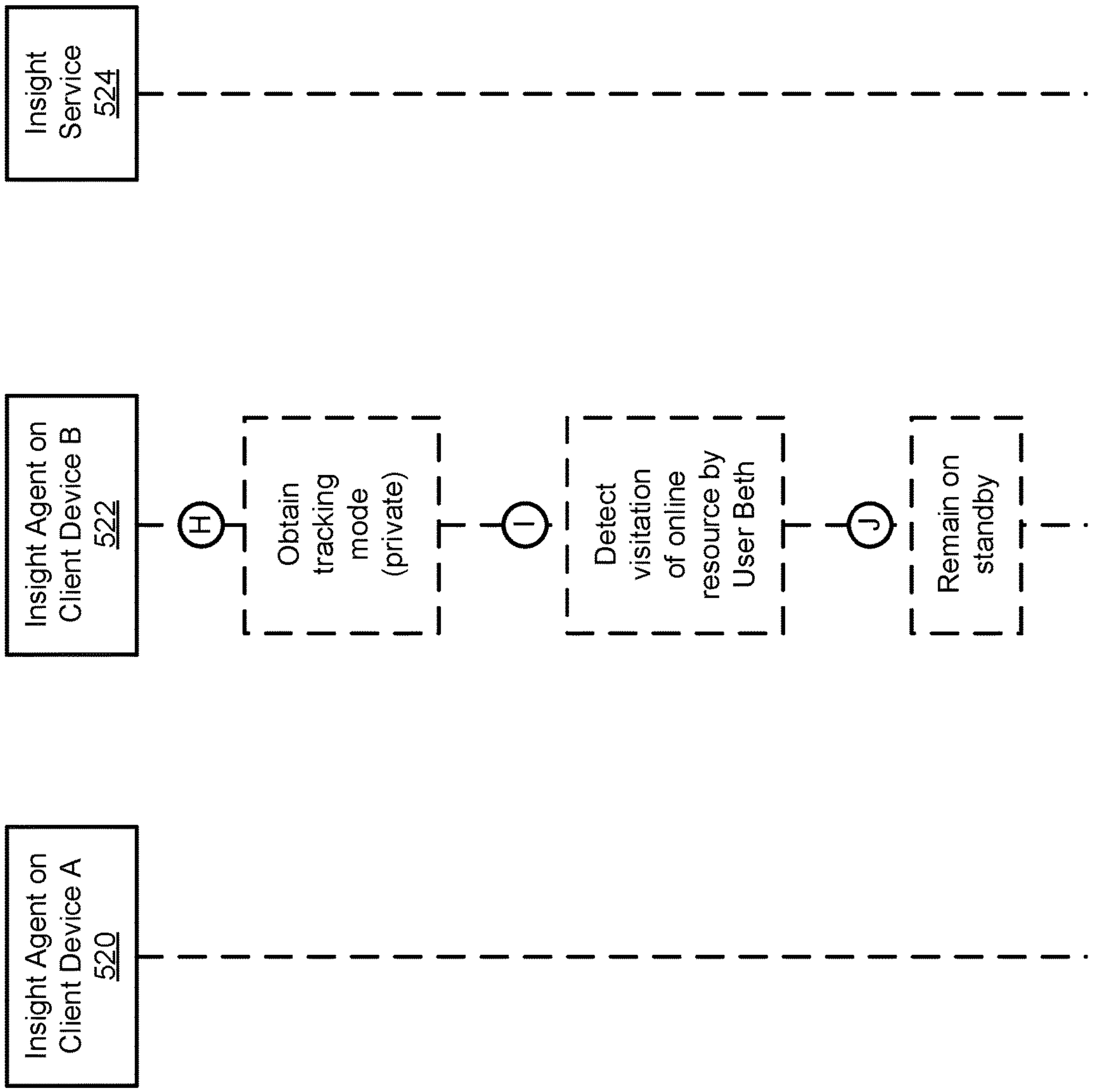
Figure 5I:
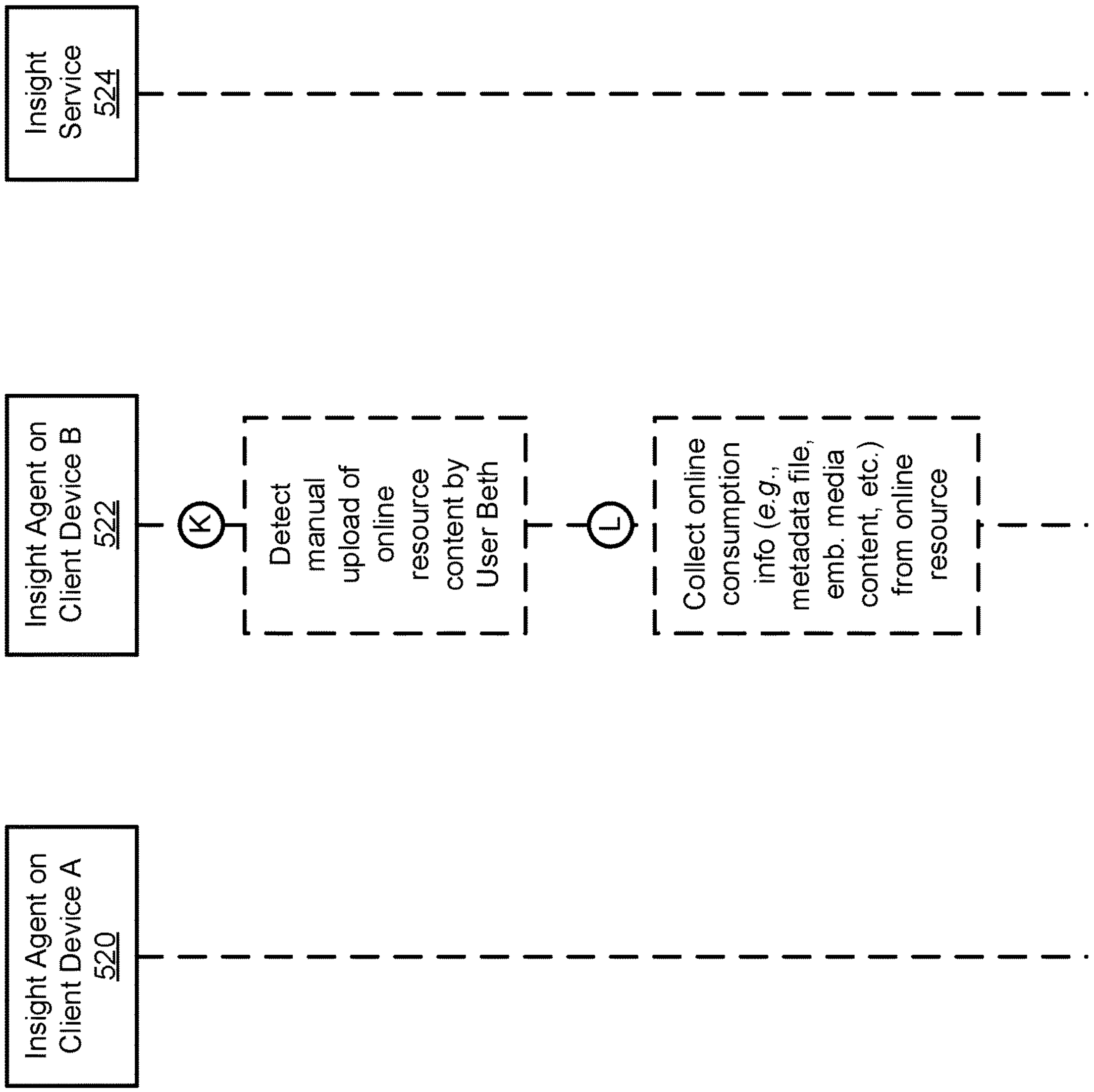
Figure 5J:
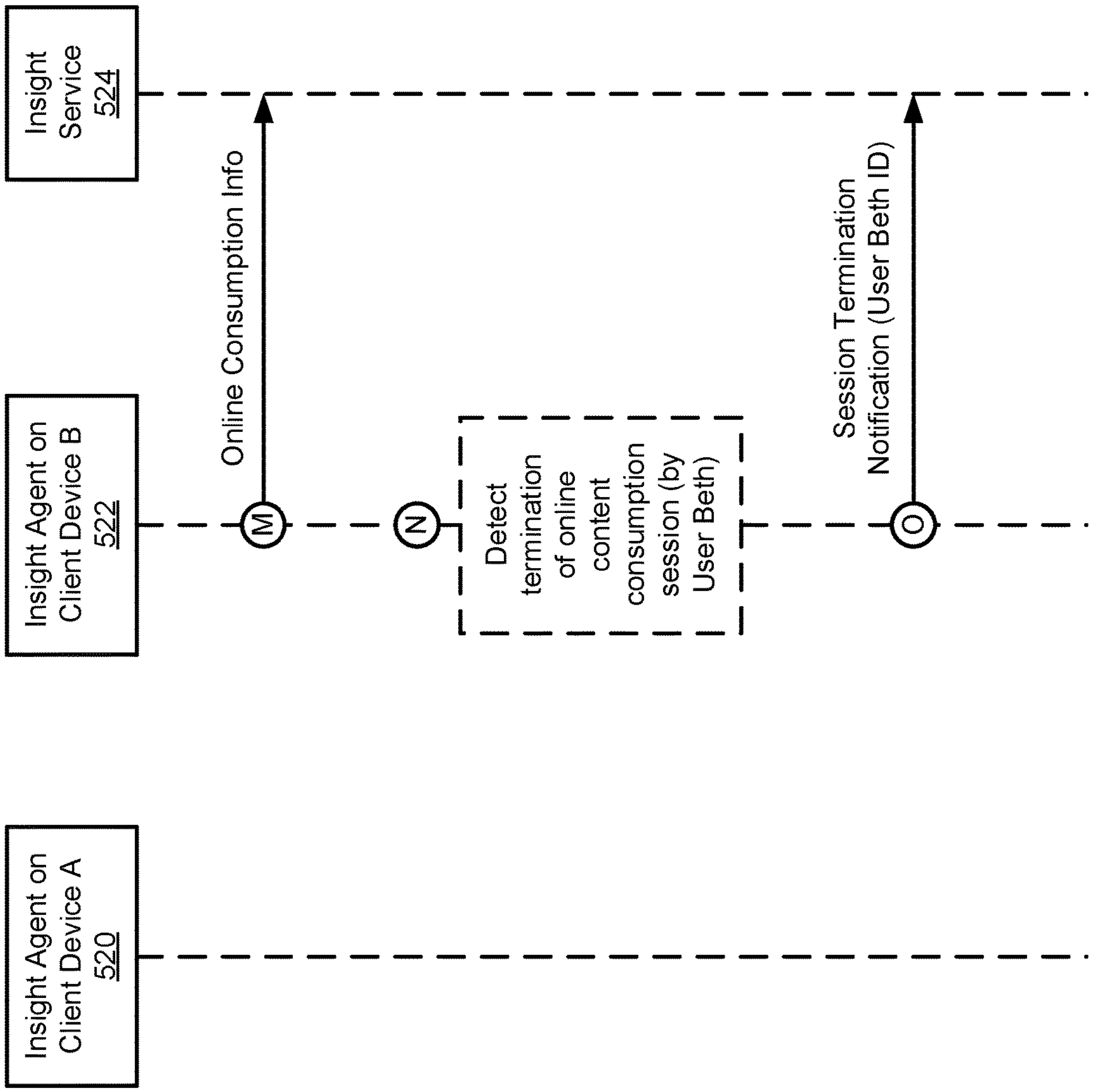
Figure 5K:
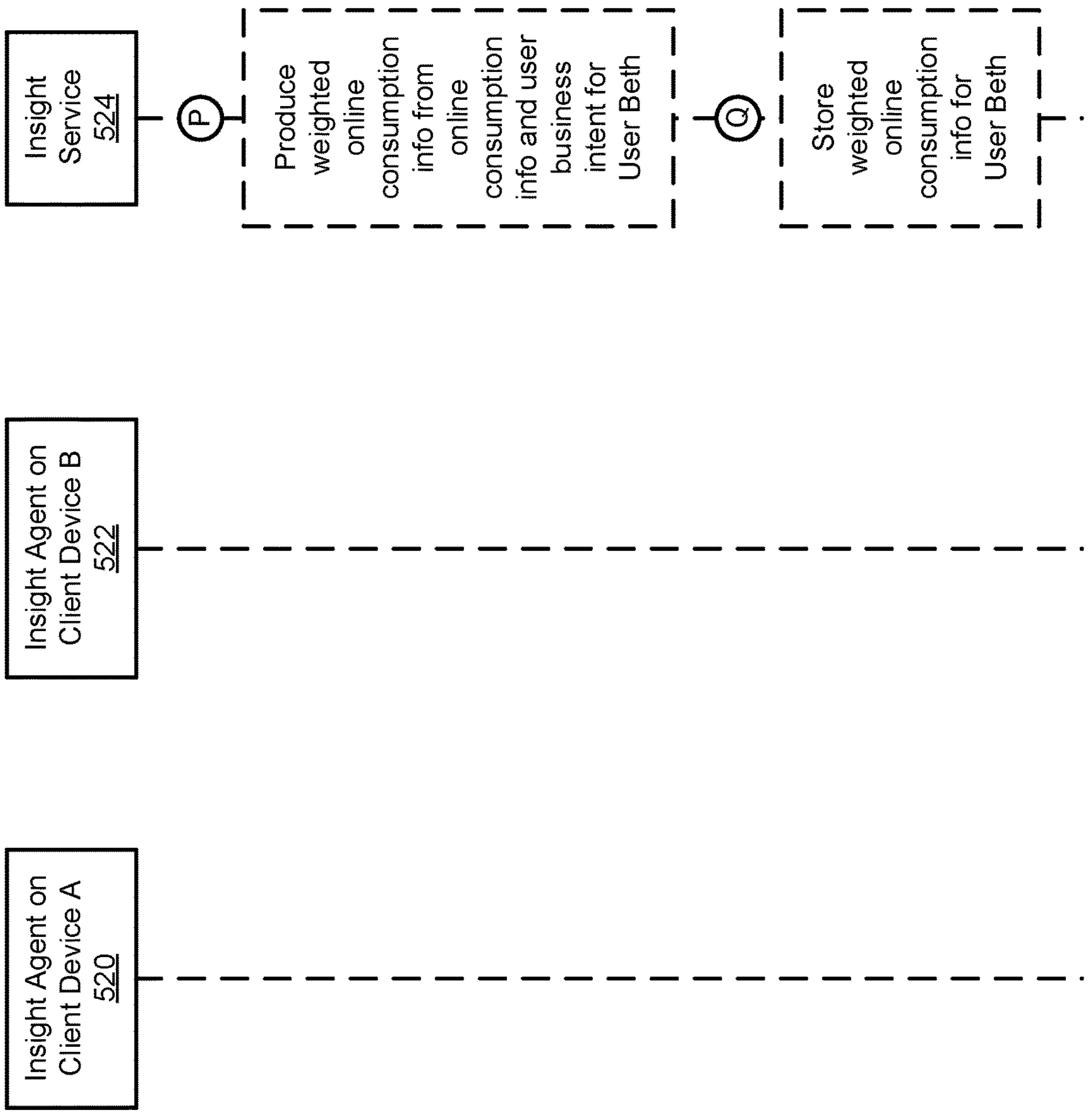

Turning to FIG. 5B:

1. User Lucy opens a web browser (500) (e.g., an online resources accessing program) thus initiating an online content consumption session, where the Insight Agent on Client Device A (520), the latter of which is being operated by User Lucy, detects said initiation of the online content consumption session
2. The Insight Agent on Client Device A (520) submits a session initiation notification to the Insight Service (524), where the session initiation notification specifies user credentials (User Lucy ID) pertaining to User Lucy 3. In response to the submitted session initiation notification and based on the specified user credentials, the Insight Service (524) obtains a user business intent for User Lucy Turning to FIG. 5C:

4. The Insight Agent on Client Device A (520) prompts User Lucy to opt for a tracking mode selection
5. The Insight Agent on Client Device A (520) obtains the open tracking mode opted by User Lucy
6. User Lucy proceeds to visit a webpage (e.g., an online resource) (via the opened web browser) that pertains to artificial intelligence (AI) research, where the Insight Agent on Client Device A (520) detects said visitation of the webpage Turning to FIG. 5D:

7. While operating under the open tracking mode (opted by User Lucy), the Insight Agent on Client Device A (520) freely collects online consumption information (e.g., generates a metadata file including the webpage URL, at least a portion of the content provided on the webpage, and time spent at the webpage by User Lucy) from the webpage
8. The Insight Agent on Client Device A (520) submits the collected online consumption information to the Insight Service (524)
9. User Lucy closes the web browser thus terminating the online content consumption session, where the Insight Agent on Client Device A (520) detects said termination of the online content consumption session Turning to FIG. 5E:

A. The Insight Agent on Client Device A (520) submits a session termination notification to the Insight Service (524), where the session termination notification specifies user credentials (User Lucy ID) pertaining to User Lucy B. In response to the submitted session termination notification, the Insight Service (524) produces weighted online consumption information using the submitted online consumption information and at least a portion of the user business intent (e.g., occupation: engineer, project: AI based inquiry response engine) for User Lucy Turning to FIG. 5F:

C. The Insight Service (524) stores the produced weighted online consumption information (related to User Lucy)

D. User Beth opens a web browser (e.g., an online resources accessing program) thus initiating an online content consumption session, where the Insight Agent on Client Device B (522), the latter of which is being operated by User Beth, detects said initiation of the online content consumption session Turning to FIG. 5G:

E. The Insight Agent on Client Device B (522) submits a session initiation notification to the Insight Service (524), where the session initiation notification specifies user credentials (User Beth ID) pertaining to User Beth F. In response to the submitted session initiation notification and based on the specified user credentials, the Insight Service (524) obtains a user business intent for User Beth G. The Insight Agent on Client Device B (522) prompts User Beth to opt for a tracking mode selection Turning to FIG. 5H:

H. The Insight Agent on Client Device B (522) obtains the private tracking mode opted by User Beth I. User Beth proceeds to visit a webpage (e.g., an online resource) (via the opened web browser) that pertains to AI research, where the Insight Agent on Client Device B (522) detects said visitation of the webpage J. While operating under the private tracking mode (opted by User Beth), the Insight Agent on Client Device B (522) remains on standby Turning to FIG. 5I:

K. User Beth (via an available drop-down menu (see e.g., FIG. 5A) integrated into the web browser) opts to manually upload the visited webpage, where the Insight Agent on Client Device B (522) detects said manual upload of the webpage L. In response to detecting said manual upload of the webpage (opted by User Beth), the Insight Agent on Client Device B (522) collects online consumption information (e.g., generates a metadata file including the webpage URL, at least a portion of the content provided on the webpage, and time spent at the webpage by User Beth) from the webpage Turning to FIG. 5J:

M. The Insight Agent on Client Device B (522) submits the collected online consumption information to the Insight Service (524)

N. User Beth closes the web browser thus terminating the online content consumption session, where the Insight Agent on Client Device B (522) detects said termination of the online content consumption session O. The Insight Agent on Client Device B (522) submits a session termination notification to the Insight Service (524), where the session termination notification specifies user credentials (User Beth ID) pertaining to User Beth Turning to FIG. 5K:

P. In response to the submitted session termination notification, the Insight Service (524) produces weighted online consumption information using the submitted online consumption information and at least a portion of the user business intent (e.g., occupation: engineer, project: AI based image classification engine) for User Beth Q. The Insight Service (524) stores the produced weighted online consumption information (related to User Beth)

Figure 5L:
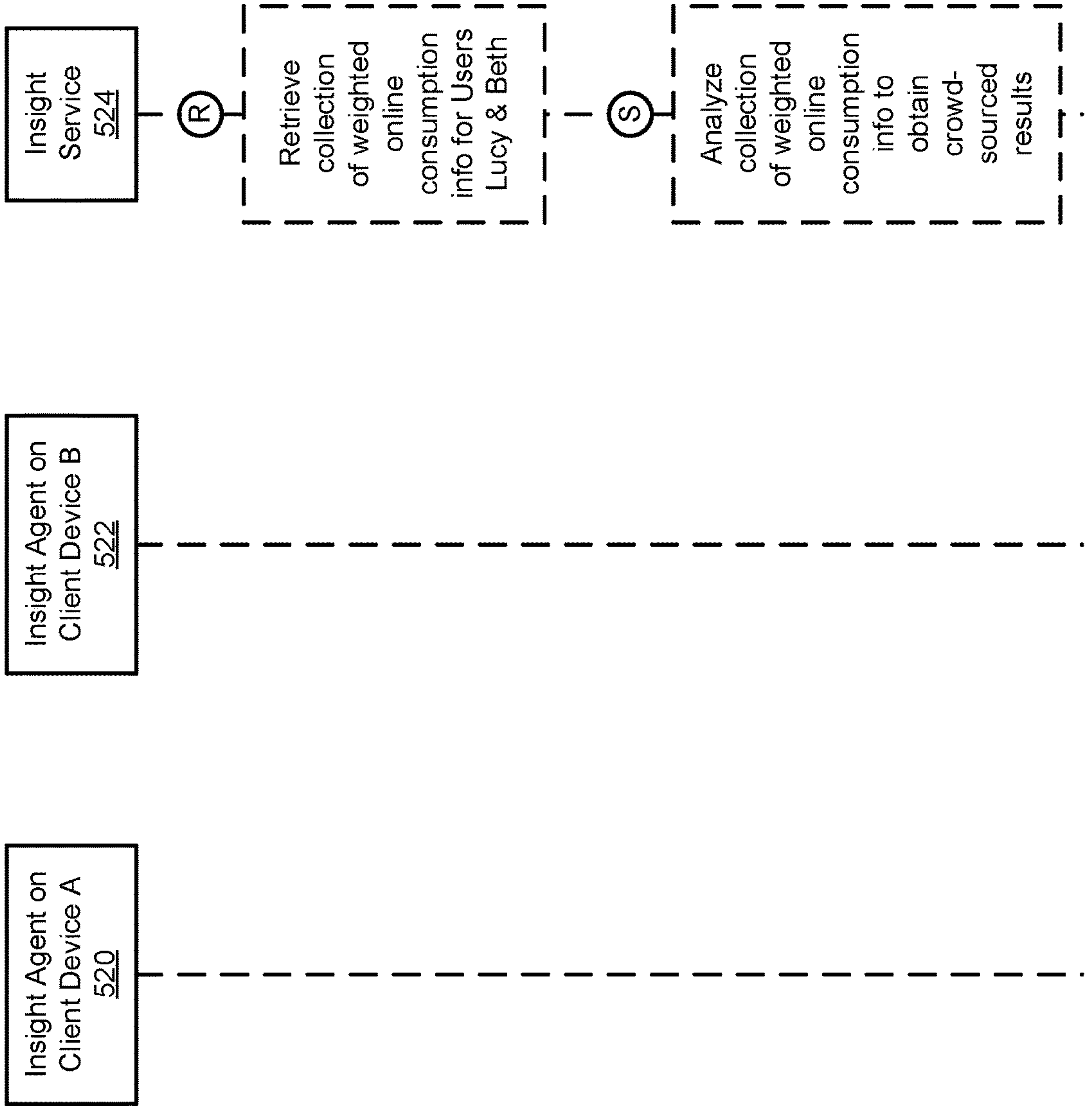

Turning to FIG. 5L:

R. The Insight Service (524) retrieves a collection of weighted online consumption information including the stored weighted online consumption information (related to User Lucy) and the stored weighted online consumption information (related to User Beth)

S. The Insight Service (524) subsequently analyzes the retrieved collection of weighted online consumption information to obtain crowd-sourced results (e.g., emergent trends in AI relevant research)

While the embodiments disclosed herein have been described with respect to a limited number of embodiments, those skilled in the art, having benefit of this disclosure, will appreciate that other embodiments can be devised which do not depart from the scope disclosed herein as disclosed herein. Accordingly, the scope disclosed herein should be limited only by the attached claims.

What is claimed is:

1. A method for crowd-sourced information analyses to detect emergent trends within a research domain, the method comprising:

for each user of one or more users within an organization:

detecting an initiation of an online content consumption session;

obtaining a user profile associated to each user of the one or more users that initiated the online content consumption session, wherein the user profile comprises a user business intent associated with the organization;

obtaining a tracking mode for the online content consumption session;

collecting, using an insight agent embedded within a web browser executing on a client device operated by each user, online consumption information of an online resource based on the tracking mode, wherein the collecting comprises:

monitoring engagement of each user with the online resource via the web browser during the online content consumption session;

extracting a granularity of content from the online resource based on the tracking mode, wherein:

when the tracking mode is an open tracking mode, the extracting is performed autonomously by the insight agent without intervention by each user; and when the tracking mode is a private tracking mode, the extracting is performed by the insight agent only upon detecting a consent event comprising a manual opt-in by each user via an interface associated with the insight agent;

generating a metadata file for the online resource, wherein the metadata file comprises a universal resource locator (URL) associated with the online resource, a summary of content provided by the online resource, at least one engagement metric comprising a measure of time spent on the online resource by each user, and one or more annotations associated with content of the online resource; and transmitting, using the insight agent, the metadata file to an insight service for processing;

detecting, via the insight agent, a termination of the online content consumption session, wherein detecting the termination comprises detecting a closure of the web browser;

following the termination of the online content consumption session of each user:

analyzing the metadata file to determine a similarity between a meaning associated the collected online consumption information and the user business intent to obtain a semantic similarity score, wherein the semantic similarity score reflects a level of significance of the collected online consumption information; and producing a weighted online consumption information based on the semantic similarity score, wherein the weighted online consumption information is proportional to the semantic similarity score; and collectively evaluating the weighed online consumption information from each user to obtain crowd-sourced results, wherein the crowd-sourced results comprise predictions for emergent trends within the research domain of which the one or more users are considered subject matter experts.

2. The method of claim 1, wherein the online content consumption session represents a time frame within which a consumption of the content provided by the online resource occurs.

3. The method of claim 2, wherein the online content consumption session is initiated through an opening of a software application configured to enable access to the online resource.

4. The method of claim 1, wherein the tracking mode is one selected from a group of tracking modes comprising an open tracking mode and a private tracking mode.

5. The method of claim 4, wherein the tracking mode is the open tracking mode, wherein the online consumption information is collected without intervention by a user of the one or more users that initiated the online content consumption session.

6. The method of claim 4, wherein the tracking mode is the private tracking mode, wherein the online consumption information is collected in response to consent given by a user of the one or more users that initiated the online content consumption session.

7. The method of claim 1, wherein the weighted online consumption information is produced from at least a portion of the user business intent.

8. The method of claim 1, wherein the collectively evaluated weighted online consumption information from each user further comprises second weighted online consumption information collected during a second online content consumption session for and initiated by a second organization user.

9. A non-transitory computer readable medium (CRM) comprising computer readable program code, which when executed by a computer processor, enables the computer processor to perform a method for crowd-sourced information analyses to detect emergent trends within a research domain, the method comprising:

for each user of one or more users within an organization:

detecting an initiation of an online content consumption session;

obtaining a user profile associated to each user of the one or more users that initiated the online content consumption session, wherein the user profile comprises a user business intent associated with the organization;

obtaining a tracking mode for the online content consumption session;

collecting, by an insight agent embedded within a web browser executing on a client device operated by each user, online consumption information of an online resource based on the tracking mode, wherein the collecting comprises:

monitoring, using the insight agent, engagement of each user with the online resource via the web browser during the online content consumption session;

extracting a granularity of content from the online resource based on the tracking mode, wherein:

when the tracking mode is an open tracking mode, the extracting is performed autonomously by the insight agent without intervention by each user, and when the tracking mode is a private tracking mode, the extracting is performed by the insight agent only upon detecting a consent event comprising a manual opt-in action by each user via an interface associated with the insight agent;

generating a metadata file for the online resource, wherein the metadata file comprises a universal resource locator (URL) associated with the online resource, a summary of content provided by the online resource, at least one engagement metric comprising a measure of time spent on the online resource by each user, and one or more annotations associated with content of the online resource; and transmitting, by the insight agent, the metadata file to an insight service for processing;

detecting, using the insight agent, a termination of the online content consumption session, wherein detecting the termination comprises detecting a closure of the web browser;

following the termination of the online content consumption session of each user:

analyzing the metadata file to determine a similarity between a meaning associated the collected online consumption information and the user business intent to obtain a semantic similarity score, wherein the semantic similarity score reflects a level of significance of the collected online consumption information; and producing a weighted online consumption information based on the semantic similarity score, wherein the weighted online consumption information is proportional to the semantic similarity score; and collectively evaluating the weighted online consumption information from each user to obtain crowd-sourced results, wherein the crowd-sourced results comprise predictions for emergent trends within the research domain of which the one or more users are considered subject matter experts.

10. The non-transitory CRM of claim 9, wherein the tracking mode is one selected from a group of tracking modes comprising an open tracking mode and a private tracking mode.

11. The non-transitory CRM of claim 10, wherein the tracking mode is the open tracking mode, wherein the online consumption information is collected without intervention by a user of the one or more users that initiated the online content consumption session.

12. The non-transitory CRM of claim 10, wherein the tracking mode is the private tracking mode, wherein the online consumption information is collected in response to consent given by a user of the one or more users that initiated the online content consumption session.

13. The non-transitory CRM of claim 9, wherein the weighted online consumption information is produced from at least a portion of the user business intent.

14. A system, the system comprising:

one or more client devices, wherein an insight agent embedded within a web browser is configured to execute on each of the one or more client devices; and an insight service comprising a computer processor in communication with the one or more client devices and is configured to perform a method for crowd-sourced information analyses to detect emergent trends within a research domain, the method comprising:

for each user of one or more users within an organization:

detecting an initiation of an online content consumption session;

obtaining a user profile associated to each user of the one or more users that initiated the online content consumption session, wherein the user profile comprises a user business intent associated with the organization;

obtaining a tracking mode for the online content consumption session;

collecting, using the insight agent executing on a client device operated by each user of the one or more client devices, online consumption information of an online resource based on the tracking mode, wherein the collecting comprises:

monitoring, using the insight agent, engagement of each user with the online resource via the web browser during the online content consumption session;

extracting a granularity of content from the online resource based on the tracking mode, wherein:

when the tracking mode is an open tracking mode, the extracting is performed autonomously by the insight agent without intervention by each user; and when the tracking mode is a private tracking mode, the extracting is performed by the insight agent only upon detecting a consent event comprising a manual opt-in action by each user via an interface associated with the insight agent;

generating a metadata file for the online resource, wherein the metadata file comprises a universal resource locator (URL) associated with the online resource, a summary of content provided by the online resource, at least one engagement metric comprising a measure of time spent on the online resource by each user, and one or more annotations associated with content of the online resource; and transmitting, using the insight agent, the metadata file to the insight service for processing;

detecting, via the insight agent, a termination of the online content consumption session, wherein detecting the termination comprises detecting a closure of the web browser;

following the termination of the online content consumption session of each user:

analyzing the metadata file to determine a similarity between a meaning associated the collected online consumption information and the user business intent to obtain a semantic similarity score, wherein the semantic similarity score reflects a level of significance of the collected online consumption information; and producing a weighted online consumption information based on the semantic similarity score, wherein the weighted online consumption information is proportional to the semantic similarity score; and collectively evaluating the weighed online consumption information from each user to obtain crowd-sourced results, wherein the crowd-sourced results comprise predictions for emergent trends within the research domain of which the one or more users are considered subject matter experts.

* * * * *